US 7,391,979 B2

(12) United States Patent
Yamaguchi et al.

(10) Patent No.: US 7,391,979 B2
(45) Date of Patent: Jun. 24, 2008

(54) IMAGE PROCESSING APPARATUS AND METHOD OF AUTOMATIC REBOOT

(75) Inventors: Yukio Yamaguchi, Chiba (JP); Yoh Masuyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 343 days.

(21) Appl. No.: 11/045,353

(22) Filed: Jan. 31, 2005

(65) Prior Publication Data
US 2005/0179931 A1 Aug. 18, 2005

(30) Foreign Application Priority Data
Feb. 3, 2004 (JP) ............................. 2004-027232
Feb. 10, 2004 (JP) ............................. 2004-033953

(51) Int. Cl.
*G03G 15/00* (2006.01)
*G06F 11/00* (2006.01)
(52) U.S. Cl. ............................................. 399/9; 714/48
(58) Field of Classification Search .................. 399/9, 399/18, 38, 75, 81; 713/1, 2, 320; 358/1.14; 347/19; 714/2, 44, 48
See application file for complete search history.

(56) References Cited
U.S. PATENT DOCUMENTS
4,745,602 A 5/1988 Morrell 5,208,814 A * 5/1993 Ulrich et al. .................. 714/47
5,533,193 A 7/1996 Roscoe
6,662,318 B1 12/2003 Baysah et al.
2003/0105995 A1* 6/2003 Schroath et al ............... 714/48

FOREIGN PATENT DOCUMENTS

| EP | 0 478 343 A2 | 4/1992 |
|---|---|---|
| JP | 05-033255 | 4/1993 |
| JP | 2000-322208 | 11/2000 |
| JP | 2001-310537 | 11/2001 |
| JP | 2003-228258 | 8/2003 |
| JP | 3531776 | 3/2004 |

* cited by examiner

*Primary Examiner*—Sandra L Brase
(74) *Attorney, Agent, or Firm*—Oblon, Spivak, McClelland, Maier & Neustadt, P.C.

(57) ABSTRACT

An image processing apparatus is disclosed that, when falling in failures possibly being fixable by switching off/on electric power, is able to be automatically and appropriately rebooted and does not involve disagreement in counts of different counters used for management actions in the course of rebooting process. The image processing apparatus, which has hardware resources used for image formation and programs used for controlling the image formation, includes a failure detection unit to detect a rebooting failure from type A or D failures which are possibly fixable by switching off/on electric power of the image processing apparatus, and a reboot unit to reboot the hardware resources and the programs. The image processing apparatus may further include an operation halting unit to halt operations of the hardware resources and the programs when the rebooting failure is detected.

30 Claims, 17 Drawing Sheets

FIG.10

| | | 1ST FAILURE | ⇒ | 2ND FAILURE | EXECUTION OF AUTOMATIC REBOOT | |
|---|---|---|---|---|---|---|
| (1) | X | D (NO NOTIFICATION) AUTOMATIC REBOOT | ⇒ | D (NOTIFICATION) AUTOMATIC NOTIFICATION | NO EXECUTION | NOTIFICATION ON SCREEN (NOTIFICATION FAILS) |
| | Y | AUTOMATIC REBOOT | | NO CHANGE | EXECUTION | |
| (2) | X | D (NOTIFICATION) AUTOMATIC NOTIFICATION | ⇒ | D (NO NOTIFICATION) NO CHANGE | NO EXECUTION | NOTIFICATION ON SCREEN (NOTIFICATION SUCCEEDS) |
| | Y | AUTOMATIC NOTIFICATION | | NO CHANGE | NO EXECUTION | NOTIFICATION ON SCREEN (NOTIFICATION SUCCEEDS) |
| (3) | X | D (NO NOTIFICATION) AUTOMATIC REBOOT | ⇒ | A (NOTIFICATION) AUTOMATIC NOTIFICATION | NO EXECUTION | NOTIFICATION ON SCREEN (NOTIFICATION FAILS) |
| | Y | AUTOMATIC REBOOT | | NO CHANGE | EXECUTION | (REBOOT EVEN WHEN TYPE A FAILURE OCCURS) |
| (4) | X | D (NOTIFICATION) AUTOMATIC NOTIFICATION | ⇒ | A (NOTIFICATION) NO CHANGE | NO EXECUTION | NOTIFICATION ON SCREEN (NOTIFICATION SUCCEEDS) |
| | Y | AUTOMATIC NOTIFICATION | | NO CHANGE | NO EXECUTION | NOTIFICATION ON SCREEN (NOTIFICATION SUCCEEDS) |
| (5) | X | A (NOTIFICATION) AUTOMATIC NOTIFICATION | ⇒ | D (NO NOTIFICATION) NO CHANGE | NO EXECUTION | NOTIFICATION ON SCREEN (NOTIFICATION SUCCEEDS) |
| | Y | AUTOMATIC NOTIFICATION | | NO CHANGE | NO EXECUTION | NOTIFICATION ON SCREEN (NOTIFICATION SUCCEEDS) |
| (6) | X | A (NOTIFICATION) AUTOMATIC NOTIFICATION | ⇒ | D (NOTIFICATION) NO CHANGE | NO EXECUTION | NOTIFICATION ON SCREEN (NOTIFICATION SUCCEEDS) |
| | Y | AUTOMATIC NOTIFICATION | | NO CHANGE | NO EXECUTION | NOTIFICATION ON SCREEN (NOTIFICATION SUCCEEDS) |

IMAGE PROCESSING APPARATUS AND METHOD OF AUTOMATIC REBOOT

BACKGROUND OF THE INVENTION

1. Field of the Invention

The present invention relates to an image processing apparatus and a method of automatic reboot.

2. Description of the Related Art

In an image processing apparatus such as a copier, for the purpose of charging or other management actions, several kinds of hardware or software-based counters are installed in the copier to count each printing operation. For example, in the copier, there may be a general counter of a controller, a counter of a charging device in the controller, a mechanical counter of an engine, and a counter of a charging device in the engine. It is required that these counters accurately count each printing operation. If the counts are not correct, charging or other management actions cannot be made appropriately.

FIG. 1 is a diagram illustrating a sequence of operations of counters in an image processing apparatus in the related art. Here, it is assumed that two sheets are printed sequentially.

As illustrated in FIG. 1, in step S2501, a notification of starting a printing job is transmitted from an application 2201, which controls copying operations, to an xCS 2204, such as an Engine Control Service (ECS).

In step S2502, receiving the notification from the application 2201, the xCS 2204 notifies a system control service (SCS) 2203 to start a process of printing the first sheet.

In step S2503, receiving the notification from the xCS 2204, the SCS 2203 notifies an engine 2206 to start the process of printing the first sheet.

In step S2504, receiving the notification from SCS 2203, the engine 2206 starts to feed the first sheet, and notifies the SCS 2203 that the first sheet is fed.

In step S2505, the SCS 2203 further notifies the xCS 2204 that the first sheet is fed.

In step S2506, receiving the notification from the SCS 2203, the xCS 2204 notifies the SCS 2203 to start a process of printing the second sheet.

In step S2507, the SCS 2203 notifies the engine 2206 to start the process of printing the second sheet.

In step S2508, the engine 2206 starts to feed the second sheet, and notifies the SCS 2203 that the second sheet is fed.

Here, in order to improve printing performance, the process of printing the second sheet is started while the first sheet is being fed.

In step S2509, the engine 2206 executes printing of the first sheet, and increments the count of the mechanical counter of the engine 2206 when fusing on the first sheet is completed.

In step S2510, the engine 2206 notifies the SCS 2203 of completion of fusing on the first sheet.

In step S2511, receiving the notification from the engine 2206, the SCS 2203 increments the count in the general counter of the controller.

In step S2512, the SCS 2203 requests the engine 2206 to count.

In step S2513, receiving the request from the SCS 2203, the engine 2206 increments the count in the counter of the charging device in the engine.

Afterward, in step S2514, when the first sheet is normally delivered, the engine 2206 notifies the SCS 2203 of the normal delivery of the first sheet.

In step S2515, the SCS 2203 further notifies the xCS 2204 that the first sheet is normally delivered.

In step S2516, the xCS 2204 further notifies the application 2201 that the first sheet is normally delivered.

In step S2517, receiving the notification from the xCS 2204, the application 2201 requests the SCS 2203 to count.

In step S2518, the SCS 2203 increments the count in the counter of the charging device in the controller.

Similarly, in step S2519, the engine 2206 executes printing of the second sheet, and increments the count of the mechanical counter of the engine 2206 when fusing on the second sheet is completed.

In step S2520, the engine 2206 notifies the SCS 2203 of completion of fusing on the second sheet.

In step S2521, receiving the notification from the engine 2206, the SCS 2203 increments the count in the general counter of the controller.

In step S2522, the SCS 2203 requests the engine 2206 to count.

In step S2523, receiving the request from the SCS 2203, the engine 2206 increments the count in the counter of the charging device in the engine.

Afterward, in step S2524, when the second sheet is normally delivered, the engine 2206 notifies the SCS 2203 of the normal delivery of the second sheet.

In step S2525, the SCS 2203 further notifies the xCS 2204 that the second sheet is delivered.

In step S2526, the xCS 2204 further notifies the application 2201 that the second sheet is delivered.

In step S2527, receiving the request from the xCS 2204, the application 2201 requests the SCS 2203 to count.

In step S2528, the SCS 2203 increments the count in the counter of the charging device in the controller.

In the above operations, printing of the first sheet and the second sheet is counted by all of the general counter of the controller, the counter of the charging device in the controller, the mechanical counter of the engine, the counter of the charging device in the engine, and the counts in these counters are in agreement.

The image processing apparatus, for example, a copier, sometimes fails due to problems in hardware, software, or other problems. For example, there are primarily four types of failures as follows.

Type A: urgent failures, servicing by service person is required.

Type B: failures of specific units, no influence on basic functions of the image processing apparatus.

Type C: log function failure.

Type D: failures recoverable by switching off and re-switching on electric power.

It should be noted that this classification is made just for convenience, but does not indicate the level of gravity of the failures.

In the related art, when failures of type D occur, if the number of failure occurrences is less than a preset value, the image processing apparatus is set to automatically reboot without operations by the users.

FIG. 2 is a diagram illustrating a sequence of rebooting the image processing apparatus after failure in the related art.

As illustrated in FIG. 2, in step S2601, failure occurs in the image processing apparatus.

In steps S2602 through S2606|, almost at the same time, notifications of operation suppression are sent from the SCS 2203 to the xCS 2204, to the engine 2206 via a system resource manager (SRM) 2205, and to the applications 2201 and 2202.

In step S2607, component sections of the image processing apparatus, which have received the notifications, are driven to undertake operation suppression processing. The operation suppression processing is a kind of post-processing for appropriately terminating processes being executed so that reboot can be executed safely. For example, the operation suppression includes processing that prevents new operations by controlling an interface.

In steps S2608 through S2612, the component units of the image processing apparatus make responses of operation suppression.

In step S2613, reboot is executed.

Although the image processing apparatus in failure can be rebooted as described above, the counts in the aforesaid counters, which are provided for charging or other management actions, are in agreement.

FIG. 3 is a diagram illustrating a sequence of operations of the counters in the image processing apparatus falling into failure in the related art. Here, similarly, it is assumed that two sheets are printed sequentially.

As illustrated in FIG. 3, in step S2701, the application 2201 sends a notification to the xCS 2204 to start a printing job.

In step S2702, the xCS 2204 notifies the SCS 2203 to start a process of printing the first sheet.

In step S2703, the SCS 2203 notifies the engine 2206 to start the process of printing the first sheet.

In step S2704, receiving the notification from SCS 2203, the engine 2206 starts to feed the first sheet, and notifies the SCS 2203 that the first sheet is fed.

In step S2705, the SCS 2203 further notifies the xCS 2204 that the first sheet is fed.

In step S2706, receiving the notification from the SCS 2203, the xCS 2204 notifies the SCS 2203 to start a process of printing the second sheet.

In step S2707, the SCS 2203 notifies the engine 2206 to start the process of printing the second sheet.

In step S2708, the engine 2206 starts to feed the second sheet, and notifies the SCS 2203 that the second sheet is fed.

In step S2709, it is assumed that a rebooting failure occurs in the image processing apparatus. Here, a "rebooting failure" is a failure to solve which the image processing apparatus should be rebooted.

In steps S2710 through S2712, the SCS 2203 sends notifications to the engine 2206 to suppress new operations and abort processes in execution.

In steps S2713 and S2714, almost at the same time as steps S2710 through S712, the SCS 2203 sends notifications to the xCS 2204 and the applications 2201 for operation suppression.

In step S2715, the engine 2206 attempts to abort processes as much as possible. If the process of printing the first sheet is being executed, and cannot be aborted immediately, the engine 2206 executes printing of the first sheet, and increments the count of the mechanical counter of the engine 2206 when fusing on the first sheet is completed.

In step S2716, the engine 2206 notifies the SCS 2203 of completion of fusing on the first sheet.

In step S2717, upon receiving the notification from the engine 2206, the SCS 2203 increments the count in the general counter of the controller.

In step S2718, the SCS 2203 requests the engine 2206 to count.

In step S2719, upon receiving the request from the SCS 2203, the engine 2206 increments the count in the counter of the charging device in the engine.

Afterward, in step S2720, when the first sheet is normally delivered, the engine 2206 notifies the SCS 2203 of the normal delivery of the first sheet.

In step S2721, the SCS 2203 further notifies the xCS 2204 of the normal delivery of the first sheet.

In step S2722, the xCS 2204 further notifies the application 2201 that the first sheet is normally delivered.

At this moment, however, because the xCS 2204 has been in a state of operation suppression already, and the interface is suppressed, the notification to the application 2201 cannot be sent. For this reason, the sequence cannot proceed to the operation of the application 2201 for requesting the SCS 2203 to count (indicated as "S723" by a dotted arrow), and the operation of the SCS 2203 to increment the count in the counter of the charging device in the controller (indicated as "S724" by a dotted frame).

Afterward, in step S2725, the engine 2206 aborts printing of the second sheet, and executes abnormal delivery of the second sheet (deliver the second sheet without its being printed), and notifies the SCS 2203 of the abnormal delivery of the second sheet.

In step S2726, the SCS 2203 further notifies the xCS 2204 of the abnormal delivery of the second sheet.

As described above, the first sheet is normally printed, and printing of the first sheet is counted by the mechanical counter of the engine, the counter of the charging device in the engine, and the general counter of the controller, but is not counted by the counter of the charging device in the controller; hence, the counts in the above counters are not in agreement.

In the related art, when failures of type A occur, or when failures of type D occur at a frequency higher than a preset value, operations illustrated in FIG. 4 are performed. Other methods are utilized to respond when failures of type B or C occur.

FIG. 4 is a diagram illustrating a sequence of operations of the image processing apparatus falling into failure in the related art.

As illustrated in FIG. 4, in step S2801, failures of type A occur or failures of type D occur at a frequency higher than a preset value.

In step S2802, if an automatic notification function (referred to as Customer Satisfaction Service (CSS)) in the image processing apparatus is valid, an image for automatic notification is displayed on a service call (SC) screen SC 100 to automatically notify a service center of the failure.

In step S2803, if the notification is sent successfully, the automatic notification image displays that the image processing apparatus is waiting for service from the service center.

In step S2804, the image processing apparatus waits to be switched on/off.

In step S2805, if transmission of the notification fails, the automatic notification image displays that the service center should be contacted.

In step S2806, the image processing apparatus waits to be switched on/off.

In step S2807, if the failures of type D have occurred just occasionally, that is, below the preset frequency, even when the automatic notification function of the image processing apparatus is valid, the automatic notification is not performed, and the user is urged to switch OFF/ON the power.

In step S2808, the image processing apparatus waits to be switched on/off.

In step S2811, if the automatic notification function of the image processing apparatus is invalid, or the image processing apparatus does not have the automatic notification function, when failures of type A occur or failures of type D occur at a frequency higher than the preset value, a message is displayed on the screen to urge the user to notify the service center.

In step S2812, the image processing apparatus waits to be switched on/off.

In step S2809, if the failures of type D have occurred just occasionally, that is, below the preset frequency, a message is displayed on the screen to urge the user to switch OFF/ON the power. If the failure occurs again, a message is displayed on the screen to urge the user to notify the service center.

In step S2810, the image processing apparatus waits to be switched on/off.

However, the operations shown in FIG. 4 as a response to failures of the image processing apparatus in the related art suffer from the following problems.

When failures of type D have occurred occasionally, no matter whether the image processing apparatus has the automatic notification function or not, the user is urged to switch OFF/ON the power, and due to this, the user has to perform more operations. Because the power switch is not frequently used when making copies, some users may feel inconvenienced by having to search for the power switch.

In addition, as described above, when failures of type D have occurred at a frequency higher than the preset value, it is set that the automatic notification is performed or the user is urged to notify the service center. Among the frequently occurring failures, there are some recurring failures caused by inappropriate operation of the power switch by the user, which could have been avoided by otherwise appropriately switching OFF/ON the power. In other words, even for some less than severe failures, for example, failures fixable by the user without calling a service person, the automatic notification or the notification by the user has to be performed.

SUMMARY OF THE INVENTION

It is a general object of the present invention to solve one or more problems of the related art.

A first specific object of the present invention is to provide an image processing apparatus and a method thereof, which apparatus is able to be automatically and appropriately rebooted (reset, re-started) when falling into failures possibly fixable by switching off and on electric power.

A second specific object of the present invention is to provide an image processing apparatus and a method thereof, in which apparatus disagreement in counts of different counters used for charging or other management actions does not occur when being rebooted from failures possibly fixable by switching off and on electric power.

According to a first aspect of the present invention, there is provided an image processing apparatus including hardware resources used for image formation and programs used for controlling the image formation, the image processing apparatus comprising a failure detection unit configured to detect a first failure of the image processing apparatus from a plurality of second failures of the image processing apparatus, and a reboot unit configured to reboot the hardware resources and the programs. The image processing apparatus is rebooted when the first failure occurs. The second failures of the image processing apparatus can be recovered from by switching off and switching on electric power of the image processing apparatus.

As an embodiment, when the image processing apparatus is printing sheets until reaching a predetermined number, the first failure occurs before the number of the second failures reaches a predetermined value. Preferably, the predetermined number of sheets to be printed may be 10, and the predetermined value of the number of the second failures may be 2.

As an embodiment, the failure detection unit and the reboot unit may be realized as functions of a system control service that performs at least application management, operational section control, system message display, LED display, hardware resources management, and interruption application control.

As an embodiment, from the time when the first failure is detected to the time when the reboot process is executed, even when another failure occurs that ought to be reported automatically, the reboot process continues without the automatic notification about the other failure being performed.

As an embodiment, operations of the hardware resources and the programs may be suppressed after the first failure is detected. Preferably, the image processing apparatus stands by from the time when the hardware resources and the programs make responses to the operation suppression to the time when the reboot process is executed.

As an embodiment, in the reboot process of the hardware resources and the programs, sequentially, an engine is reset, access to a hard disk drive is halted, power of the engine is switched off, the power of the engine is switched on, and an application is rebooted. As another embodiment, in the reboot process of the hardware resources and the programs, if an energy saving mode is detected, the power of the engine is switched on after post-processing. As another embodiment, after the power of the engine is switched on, sequentially, access to the hard disk drive is halted and the application is rebooted.

As an embodiment, when the first failure is detected, an image is displayed on a screen to announce the start of a reboot process. Preferably, processing conditions of post processing of the hardware resources and the programs may be displayed in the image announcing the start of the reboot process. As another embodiment, information of the time up to the execution of the reboot process may be displayed in the image announcing the start of the reboot process. As another embodiment, a button for initiating the immediate start of the reboot process may be displayed in the image announcing the start of the reboot process.

As an embodiment, after the execution of the reboot process, an image may be displayed on a screen to require a user to make confirmation.

According to a second aspect of the present invention, there is provided a method of automatically rebooting an image processing apparatus including hardware resources used for image formation and programs used for controlling the image formation, the method comprising the steps of detecting a first failure from a plurality of second failures of the image processing apparatus, and rebooting the hardware resources and the programs when the first failure is detected. The image processing apparatus is rebooted when the first failure occurs, and the second failures can be recovered from by switching off and switching on electric power of the image processing apparatus.

As an embodiment, from the time when the first failure is detected to the time when the reboot process is executed, even when another failure occurs that ought to be reported automatically, the reboot process continues without automatic notification of the other failure being performed.

As an embodiment, operations of the hardware resources and the programs are suppressed after the first failure is detected.

As an embodiment, in the reboot process of the hardware resources and the programs, steps of resetting an engine, halting access to a hard disk drive, switching off power of the engine, switching on the power of the engine, and rebooting an application are executed sequentially.

According to a third aspect of the present invention, there is provided an image processing apparatus including hardware resources used for image formation and programs used for controlling the image formation, and the image processing apparatus comprises a failure detection unit configured to detect a first failure of the image processing apparatus from a plurality of second failures of the image processing apparatus, an operation halting unit configured to halt operations of the hardware resources and the programs after the first failure is detected, and a reboot unit configured to reboot the hardware resources and the programs. The image processing apparatus is rebooted when the first failure occurs, and the second failures of the image processing apparatus can be recovered from by switching off and switching on electric power of the image processing apparatus.

As an embodiment, the image processing apparatus further comprises a controller counter provided on a side of a controller of the programs; a controller charging device counter provided on the side of the controller; a mechanical counter provided on a side of an engine of the hardware resources; and an engine charging device counter provided on the side of the engine.

As an embodiment, the halt of operations includes halt of jobs and halt of generation of new control processes. Preferably, due to the halt of jobs, uncompleted jobs of the programs are cancelled.

As an embodiment, operations of the hardware resources and the programs are suppressed after halt of the operations and before the reboot process. Preferably, the image processing apparatus stands by from the time when the hardware resources and the programs make responses to the operation suppression to the time when the reboot process is executed.

As an embodiment, when the image processing apparatus is printing sheets until reaching a predetermined number, the first failure occurs before the number of the second failures reaches a predetermined value. Preferably, the predetermined number of sheets to be printed may be 10, and the predetermined value of the number of the second failures may be 2.

As an embodiment, the failure detection unit, the operation halting unit, and the reboot unit may be realized as functions of a system control service that performs at least application management, operational section control, system massage display, LED display, hardware resources management, and interruption application control.

As an embodiment, in the reboot process of the hardware resources and the programs, sequentially, an engine is reset, access to a hard disk drive is halted, power of the engine is switched off, the power of the engine is switched on, and an application is rebooted.

As an embodiment, when the first failure is detected, an image is displayed on a screen to announce the start of an automatic reboot process. Preferably, processing conditions of post processing of the hardware resources and the programs may be displayed in the image announcing the start of the automatic reboot process. Preferably, information of the time up to the execution of the reboot process may be displayed in the image announcing the start of the automatic reboot process. Preferably, a button for initiating the immediate start of the reboot process may be displayed in the image announcing the start of the automatic reboot process.

As another embodiment, after the execution of the reboot process, an image may be displayed on a screen to require a user to make confirmation.

According to a fourth aspect of the present invention, there is provided a method of automatically rebooting an image processing apparatus including hardware resources used for image formation and programs used for controlling the image formation, and the method comprises the steps of detecting a first failure from a plurality of second failures of the image processing apparatus, the image processing apparatus being rebooted when the first failure occurs, said second failures able to be recovered from by switching off and switching on electric power of the image processing apparatus; halting operations of the hardware resources and the programs after the first failure is detected; and rebooting the hardware resources and the programs when the first failure is detected. Preferably, the step of halting the operations includes a step of halting jobs and halting generation of new control processes. Preferably, due to the step of halting jobs, uncompleted jobs of the programs are cancelled.

According to the present invention, when coping with failures of the image processing apparatus that can possibly be recovered from by switching off and re-switching on electric power, an image processing apparatus can be automatically and appropriately rebooted without operations by a user.

In addition, when coping with failures of the image processing apparatus that can possibly be recovered from by switching off and re-switching on electric power, it is possible to provide an image processing apparatus free from disagreement in counts of different counters used for charging or other management actions.

These and other objects, features, and advantages of the present invention will become more apparent from the following detailed description of preferred embodiments given with reference to the accompanying drawings.

BRIEF DESCRIPTION OF THE DRAWINGS

FIG. 10 is a table illustrating patterns of operations in response to failures during the automatic reboot process or the automatic notification process according to the first embodiment of the present invention;

DESCRIPTION OF THE PREFERRED EMBODIMENTS

Below, preferred embodiments of the present invention are explained with reference to the accompanying drawings.

First Embodiment

Figure 5:
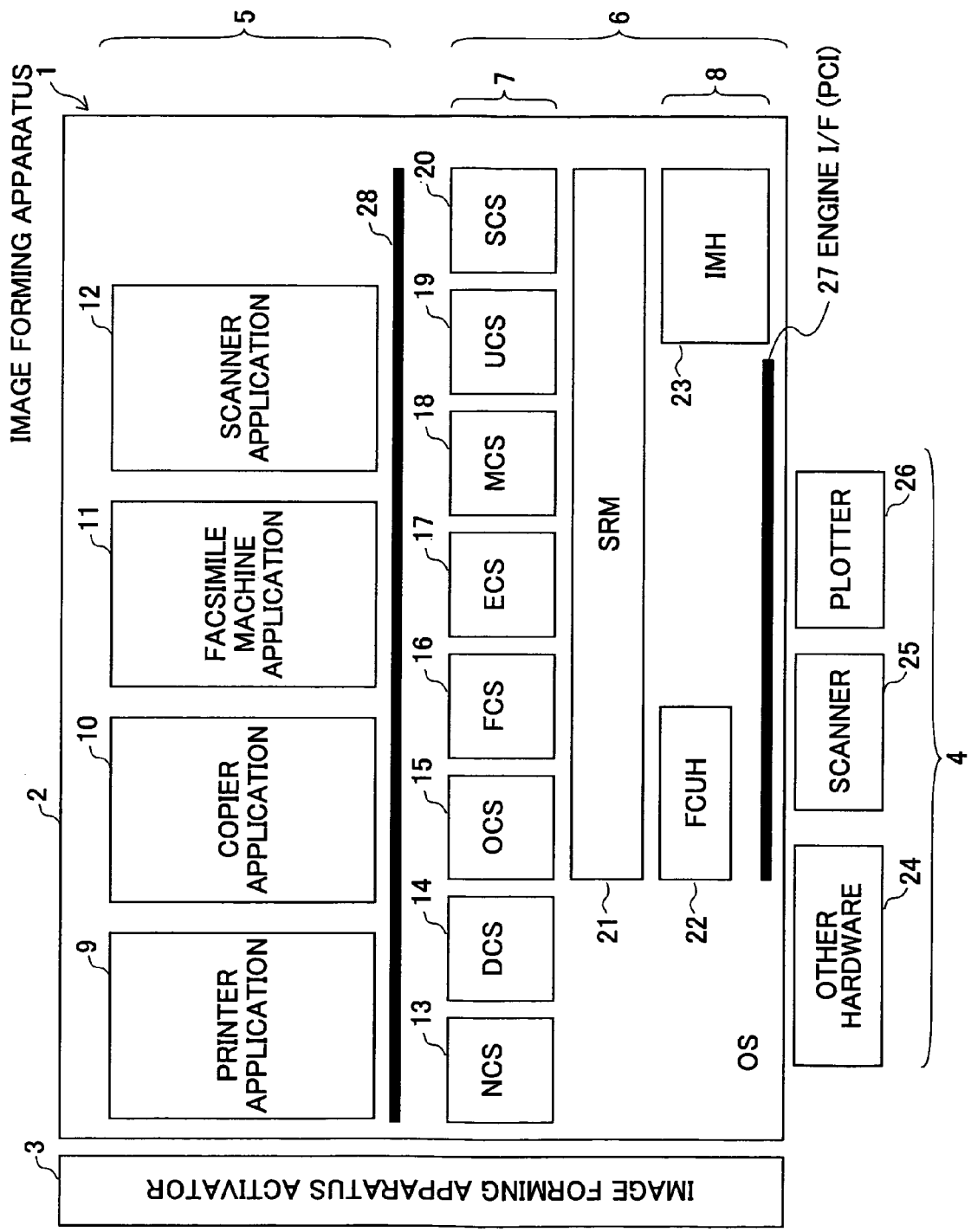
FIG. 5 is a block diagram schematically showing an example of a configuration of an image processing apparatus according to a first embodiment of the present invention.

FIG. 5 is a block diagram schematically showing an example of a configuration of an image processing apparatus according to a first embodiment of the present invention.

As illustrated in FIG. 5, the image processing apparatus 1 includes a software group 2, an image processing apparatus activator 3, and hardware resources 4.

The image processing apparatus activator 3 operates first when power of the image processing apparatus is switched on, to activate an application layer 5 and a platform layer 6. For example, the image processing apparatus activator 3 reads programs related to the application layer 5 and the platform layer 6 from a hard disk device (abbreviated to be "HDD" below), transfers the programs to a portion of a memory, and starts up the programs.

The hardware resources 4 include a scanner 25, a plotter 26, and other hardware 24 such as an ADF (Auto Document Feeder).

The software group 2 includes the application layer 5 and the platform layer 6 activated on an operating system (abbreviated to be "OS" below) such as UNIX (a registered trade mark). The application layer 5 includes programs that provide user services for image formation by a printer, a copier, a facsimile machine, a scanner, and the like. Specifically, the application layer 5 includes a printer application 9 for use of a printer, a copier application 10 for use of a copier, a facsimile machine application 11 for use of a facsimile machine, and a scanner application 12 for use of a scanner.

The platform layer 6 includes a control service layer 7, a system resource manager (abbreviated to be "SRM", below) 21, and a handler layer 8. The control service layer 7 interprets requests from the application layer 5, and generates a request for acquiring the hardware resources 4. The system resource manager (SRM) 21 manages one or more hardware resources 4 to arbitrate requests from the control service layer 7. The handler layer 8 manages the hardware resources 4 in accordance with an acquisition request from the system resource manager 21.

The control service layer 7 includes one or more service modules, such as a network control service (NCS) 13, a delivery control service (DCS) 14, an operational panel control service (OCS) 15, a facsimile control service (FCS) 16, an engine control service (ECS) 17, a memory control service (MCS) 18, a user information control service (UCS) 19, and a system control service (SCS) 20.

In addition, the platform layer 6 includes an API (Application Programming Interface) 28 which is capable of receiving a request from the application layer 5 by using functions defined beforehand. The OS executes processes related to software included in the application layer 5 and the platform layer 6 in parallel.

The process of NCS 13 provides services commonly available to applications required by the network I/O, and distributes data received from a network by using various protocols or acts as a relay to transform data from the applications to the network. For example, NCS 13 controls data communications with a network device connected to the network by HTTP (Hyper Text Transfer Protocol) using httpd (Hyper Text Transfer Protocol Daemon).

The process of DCS 14 controls delivery of stored documents.

The process of OCS 15 controls an operational panel, which functions as an information transmitter between an operator and a main body control process.

The process of FCS 16 provides APIs for facsimile transmission to and reception from the application layer 5 by using a PSTN or an ISDN, for registration or citation of various facsimile data stored in a memory for backup use, for reading facsimile, and for printing a received facsimile.

The process of ECS 17 controls engines of the scanner 25, the plotter 26, and other hardware 24.

The process of MCS 18 controls, for example, allocation and release of a memory, and utilization of the HDD.

The process of UCS 19 controls user information.

The process of SCS 20 performs, for example, application management, operational section control, system massage display, LED display, hardware resources management, and interruption application control.

The process of SRM 21, together with SCS 20, performs system control and management of the hardware resources 4, for example, in accordance with an acquisition request from an upper layer utilizing the scanner 25, the plotter 26, and other hardware 24, and controls execution of them.

Specifically, the process of SRM 21 determines whether the acquired hardware resources 4 are available or not, namely, whether the acquired hardware resources 4 are being used by other acquisition requests. If the acquired hardware resources 4 are available, the process of SRM 21 notifies the upper layer that the acquired hardware resources 4 are available. In addition, in response to the acquisition request from the upper layer, the process of SRM 21 performs scheduling in order to utilize the hardware resources 4, and directly executes the requested process, for example, paper conveyance and image capturing, memory allocation, file generation, and so on.

The handler 8 includes a facsimile controller unit handler (FCUH) 22 for controlling a facsimile controller unit (FCU), which is described below, and an image memory handler (IMH) 23 for controlling allocation of the memory to processes and the allocated memory. SRM 21 and FCUH 22 request processing by the hardware resources 4 by using an engine interface (I/F) 27, which is capable of transmitting a request for processing to the hardware resources 4 by using functions defined beforehand.

The image processing apparatus 1 can perform all processes commonly necessary for the applications.

Next, descriptions are made of a hardware configuration of the image processing apparatus 1.

Figure 6:
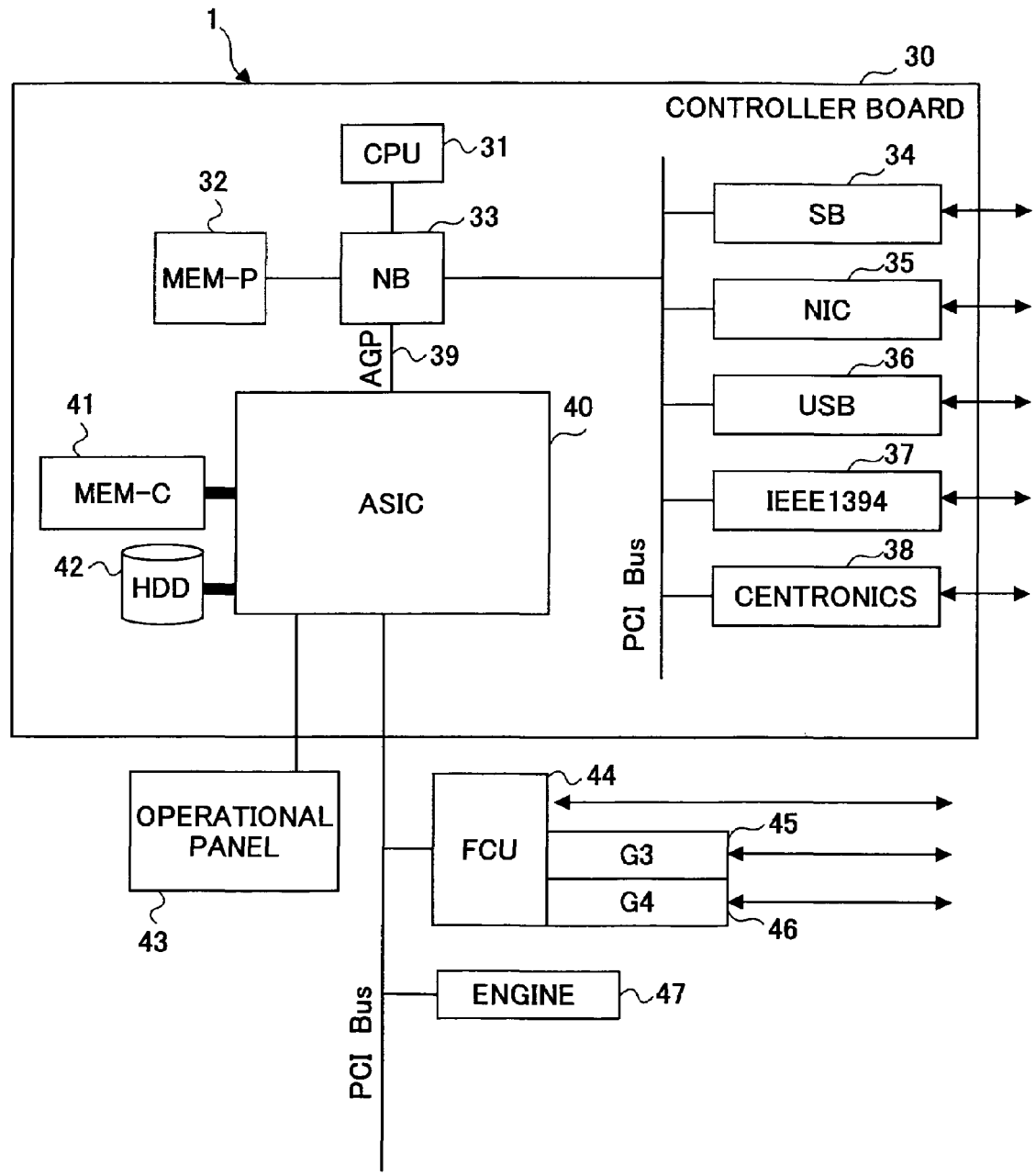
FIG. 6 is a block diagram schematically showing an example of a hardware configuration of the image processing apparatus 1 according to the first embodiment of the present invention.

FIG. 6 is a block diagram schematically showing an example of a hardware configuration of the image processing apparatus 1 according to the first embodiment of the present invention.

As illustrated in FIG. 6, the image processing apparatus 1 includes a controller board 30, an operational panel 43, a facsimile controller unit (FCU) 44, and an engine 47. The facsimile controller unit 44 includes a unit 45 in compliance with a G3 standard, and a unit 46 in compliance with a G4 standard.

The controller board 30 includes a CPU 31, an ASIC (application specific integrated circuit) 40, a HDD 42, a system memory (MEM-P) 32, a local memory (MEM-C) 41, a NorthBridge (abbreviated as "NB" below) 33, a SouthBridge (abbreviated as "SB" below) 34, a Network Interface Card (NIC) 35, a USB device 36, and IEEE 1394 device 37, and a Centronics device 38.

The operational panel 43 is connected to the ASIC 40 of the controller board 30. In addition, the SB 34, NIC 35, USB device 36, IEEE 1394 device 37, and the Centronics device 38 are connected to the NB 33 through a PCI bus.

The FCU 44 and the engine 47 are connected to the ASIC 40 of the controller board 30 through a PCI bus.

In the controller board 30, the MEM-C 41 and the HDD 42 are connected to the ASIC 40, and the CPU 31 and the ASIC 40 are connected through the NB 33 of a CPU chipset. Hence, if the CPU 31 and the ASIC 40 are connected through the NB 33, the controller board 30 operates even when the interface of the CPU 31 is not open.

Figure 1:
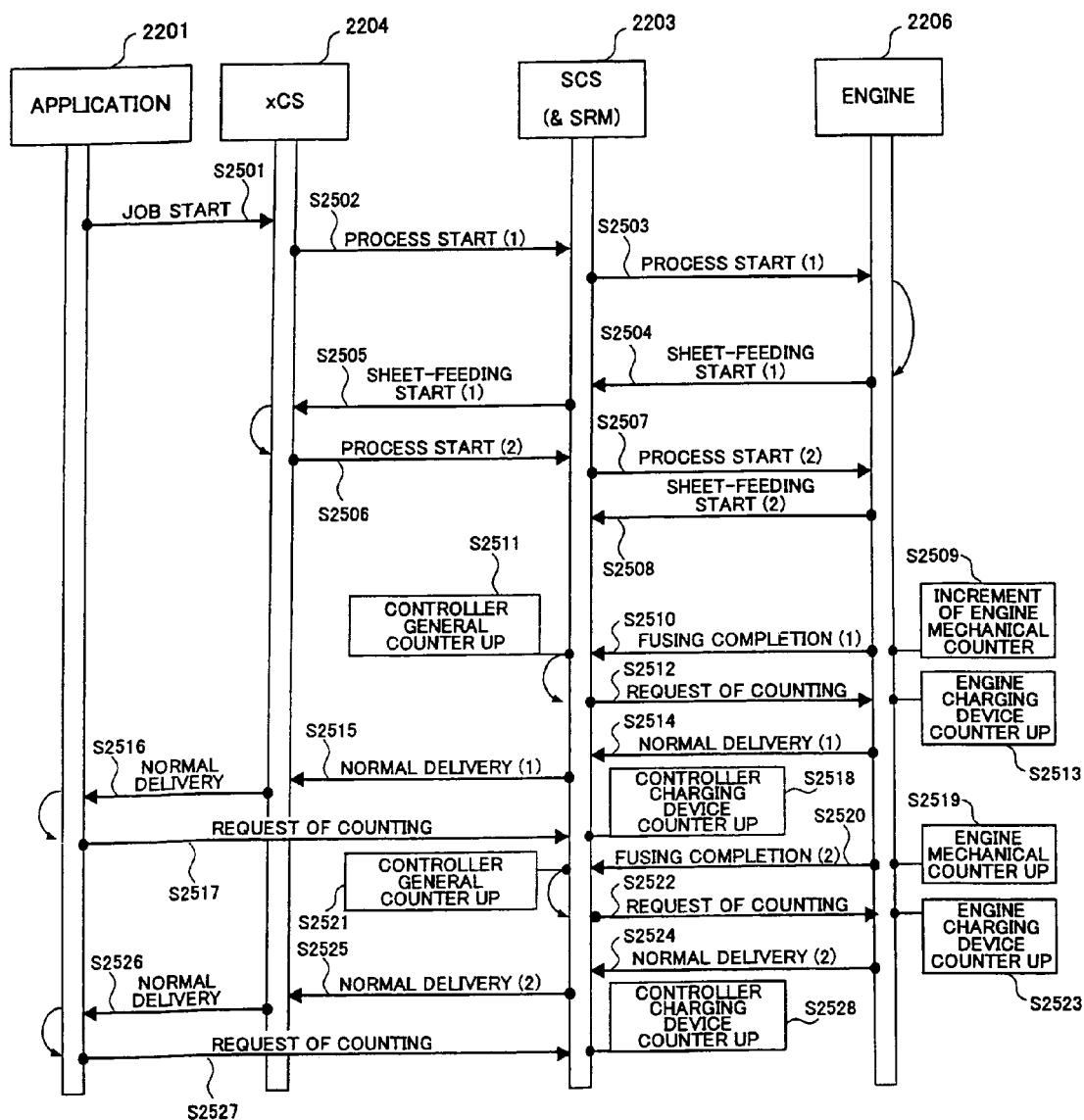
FIG. 1 is a diagram illustrating a sequence of operations of counters in an image processing apparatus in the related art.
Figure 2:
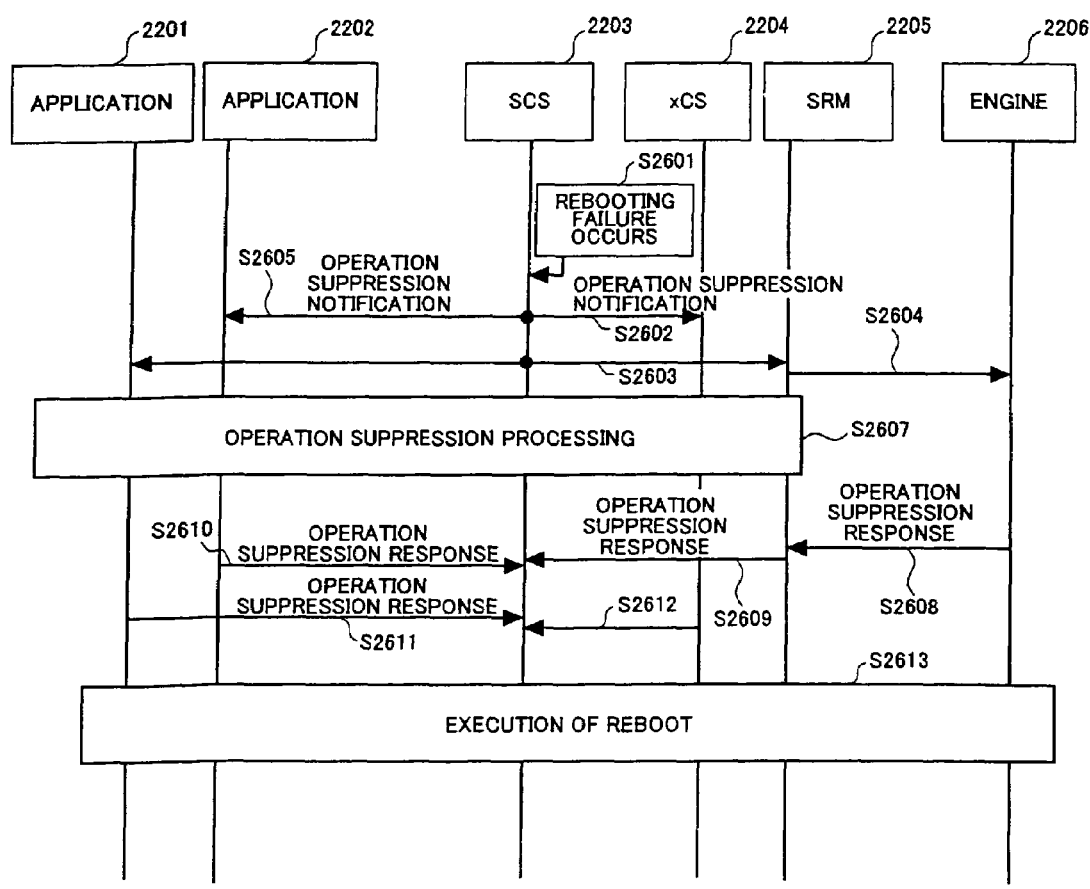
FIG. 2 is a diagram illustrating a sequence of reboot operations of the image processing apparatus in failure in the related art.
Figure 3:
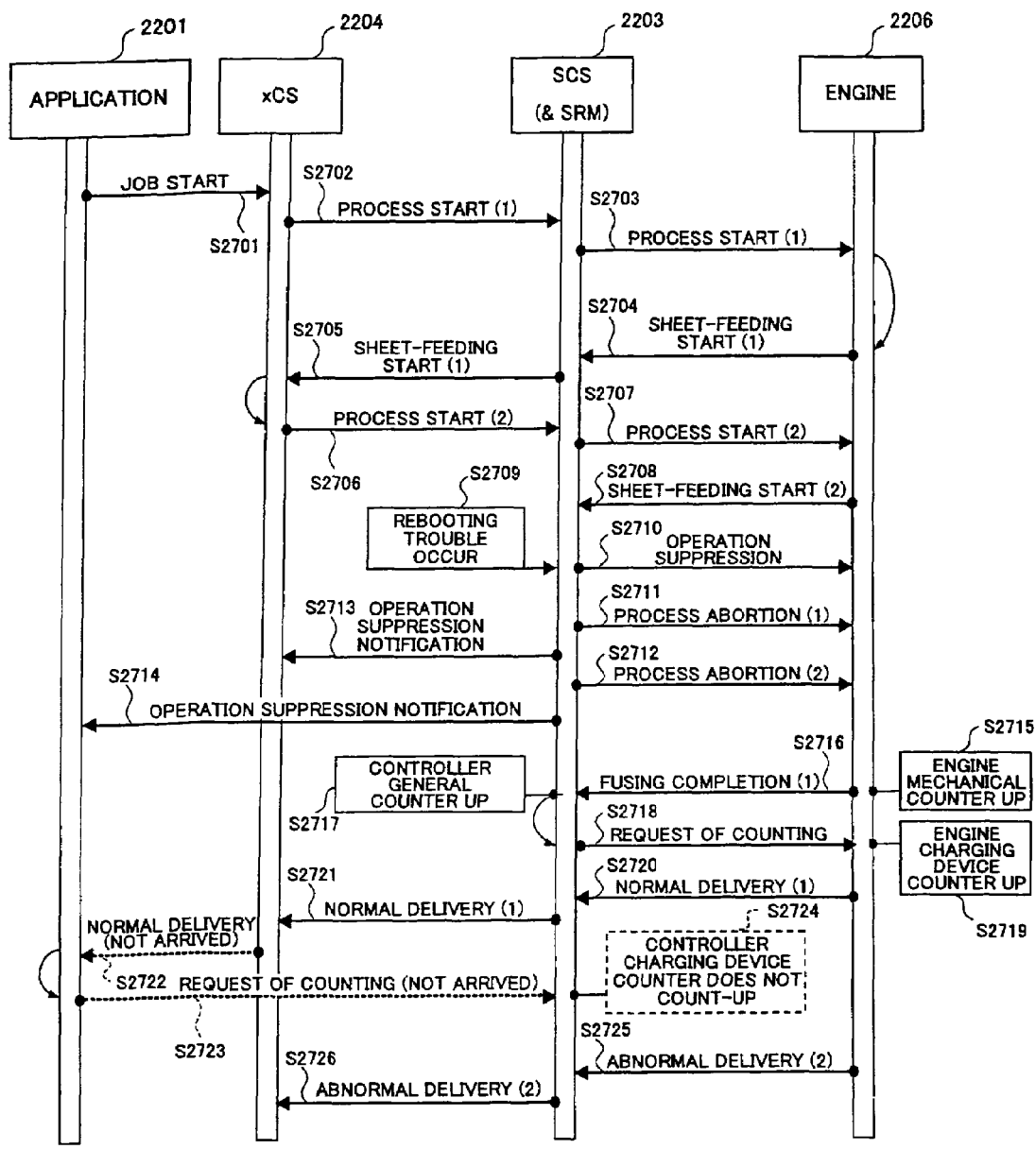
FIG. 3 is a diagram illustrating a sequence of operations of the counters in the image processing apparatus falling into failure in the related art.
Figure 4:
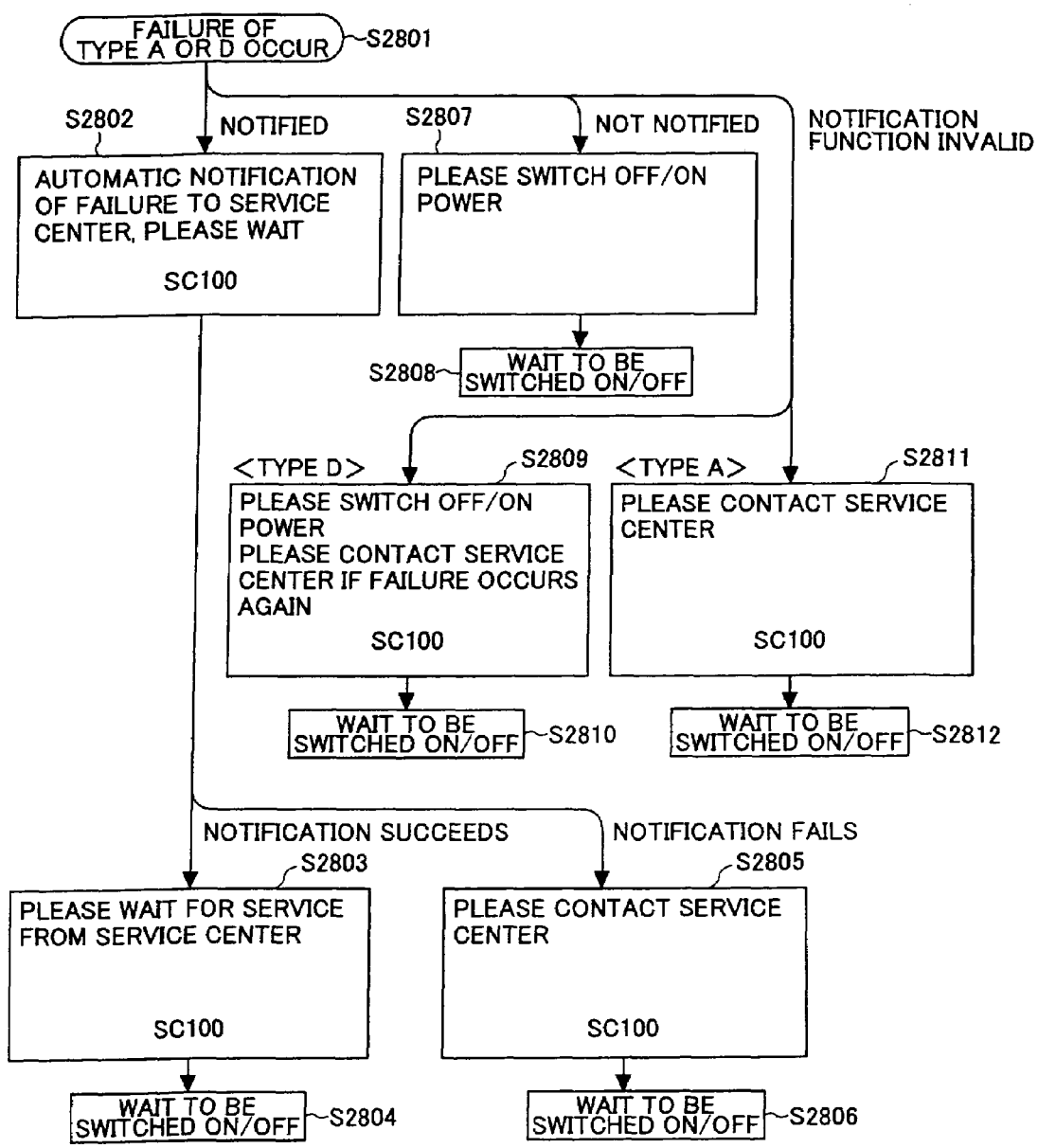
FIG. 4 is a diagram illustrating a sequence of operations of the image processing apparatus falling into failure in the related art.

The ASIC 40 and the NB 33 are not connected through the PCI bus, but are connected through an AGP (Accelerated Graphics Port) 39. Because the ASIC 40 and the NB 33 execute and control one or more processes, which constitute the application layer 5 and the platform layer 6 shown in FIG. 1, by connecting the ASIC 40 and the NB 33 through the AGP 39 instead of the PCI bus, performance degradation is preventable.

The CPU 31 controls the whole image processing apparatus 1. The CPU 31 starts up and executes the NCS 13, DCS 14, OCS 15, FCS 16, ECS 17, MCS 18, UCS 19, SCS 20, SRM 21, FCUH 22, and IMH 23 shown in FIG. 1 as respective processes on the OS, and starts up and executes the printer application 9, the copier application 10, the facsimile machine application 11, and the scanner application 12 included in the application layer 5.

The NB 33 is a bridge for connecting the CPU 31, the MEM-P 32, the SB 34, and the ASIC 40. The MEM-P 32 is used as an image memory of the image processing apparatus 1. The SB 34 is a bridge for connecting the NB 33 with the PCI bus and peripheral devices. The MEM-C 41 is used as a copier image buffer and a code buffer.

The ASIC 40 includes integrated circuits (IC), which have hardware elements for image processing and are specifically used for processing images.

The HDD 42 is a storage device for storing images, programs, font data, forms, and the like.

The operational panel 43 receives input from users, and displays messages to the users.

Figure 7:
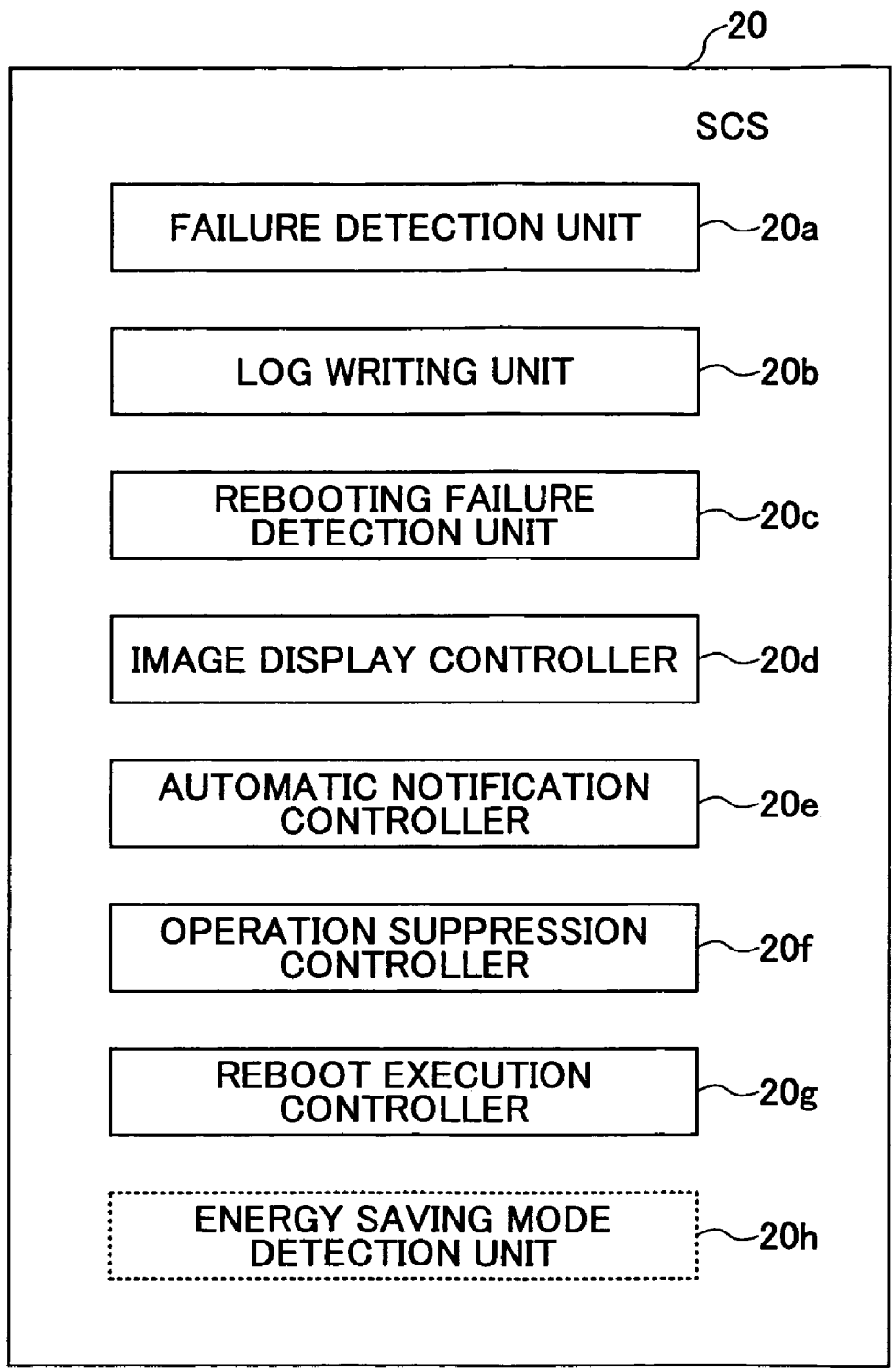
FIG. 7 is a block diagram schematically showing an example of functional sections of the SCS 20 shown in FIG. 5, which is configured to cope with failures of the image processing apparatus 1 according to the first embodiment of the present invention.

FIG. 7 is a block diagram schematically showing an example of functional sections of the SCS 20 shown in FIG. 5, which is configured to cope with failures of the image processing apparatus 1 according to the first embodiment of the present invention. Here, in FIG. 7, only sections related to fixing failures are illustrated.

As illustrated in FIG. 7, the SCS 20 includes a failure detection unit 20a that detects failures of the image processing apparatus 1 of type A and type D as described above, a log writing unit 20b that writes information of the detected failures into a log, and a rebooting failure detection unit 20c that detects a rebooting failure of the image processing apparatus 1 among the failures of type D, which can highly possibly be recovered from by switching off/on the electric power of the image processing apparatus 1.

Here, a rebooting failure indicates that the image processing apparatus needs to be rebooted when the rebooting failure occurs.

Preferably, the rebooting failure occurs before the number of occurrence of the type D failures reaches a predetermined value when the image processing apparatus 1 is printing sheets until reaching a predetermined number.

For example, the rebooting failure occurs before the number of the failures of type D reaches 2 when a count of a general counter for counting the number of the printing sheets increases toward 10, that is, the first failure of type D may be detected as a rebooting failure.

Further, the SCS 20 includes an image display controller 20d that displays an image to announce an automatic notification process and an automatic reboot process when failures occurs, and an automatic notification controller 20e that automatically notifies a service center of the failure by using NRS (New Remote Service) when failures of type A or type D occur at a predetermined frequency, for example, the failures of type D have occurred twice when the count of the general counter for counting the number of the printing sheets increases to 10. The NRS is a diagnosis service utilizing the aforesaid CSS or a network.

Further, the SCS 20 includes an operation suppression controller 20f that performs controls to suppress operations of the hardware resources 4 of the image processing apparatus 1, such as an engine, or the programs (software group 2), after the rebooting failure is detected and before the reboot process starts. For example, the operation suppression may include suppression of new operations, suppression of communications between processes, and suppression of access to the HDD.

Further, the SCS 20 includes a reboot execution controller 20g for rebooting (that is, resetting) an engine of the image processing apparatus 1 or programs in a series.

In FIG. 7, an energy saving mode detection unit 20h is for detecting an energy saving mode of the image processing apparatus 1.

Figure 8:
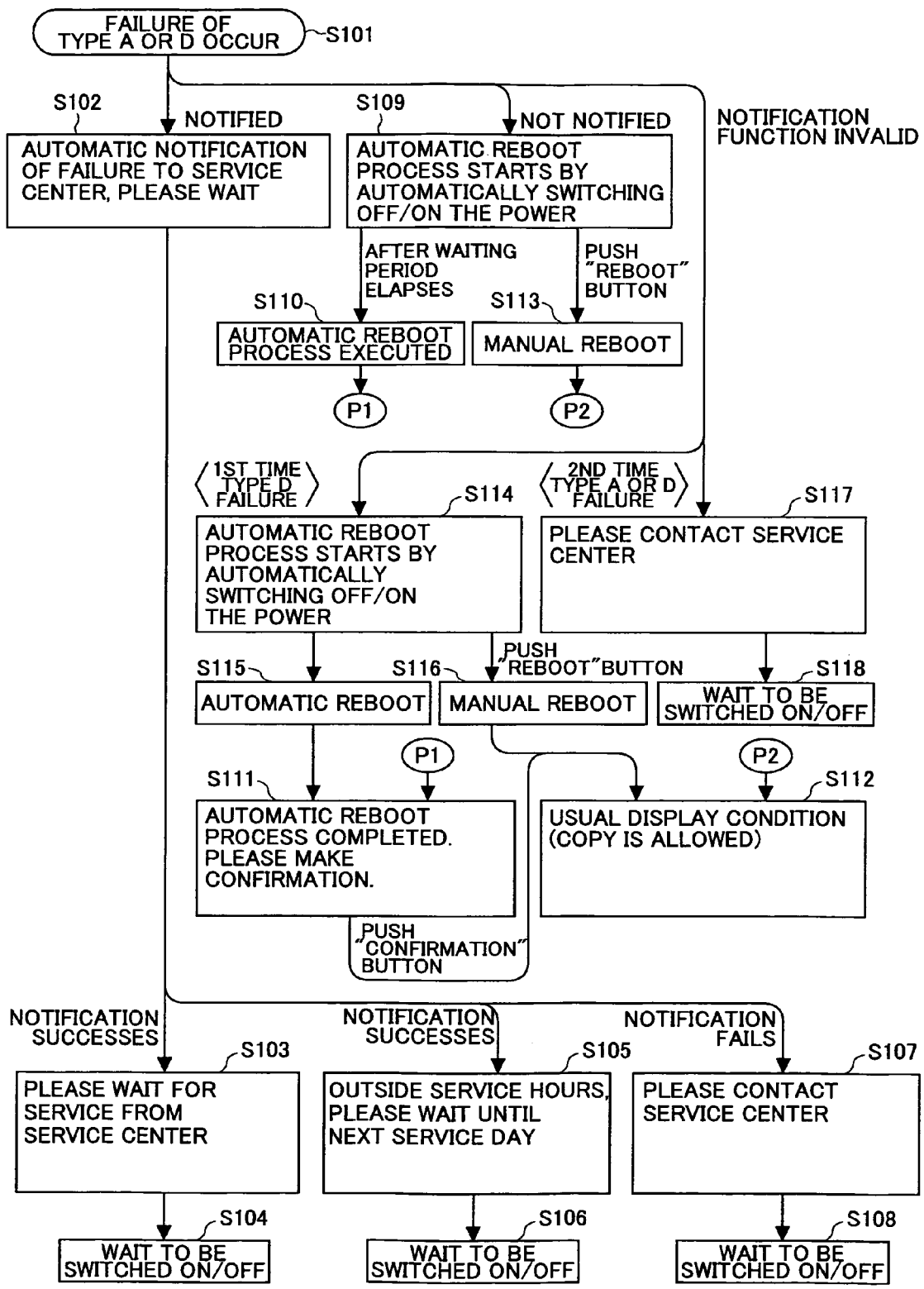
FIG. 8 is a diagram illustrating a sequence of operations of the image processing apparatus 1 when a failure occurs, according to the first embodiment of the present invention.

FIG. 8 is a diagram illustrating a sequence of operations of the image processing apparatus 1 when a failure occurs, according to the present embodiment.

As illustrated in FIG. 8, in step S101, a type A or type D failure of the image processing apparatus 1 occurs.

In step S102, in case of a failure of type A, or when the failure of type D is not a rebooting failure, for example, the failure of type D occurs for the second time when the count of the general counter for counting the number of the printing sheets increases toward 10, if the image processing apparatus 1 has an automatic notification function given by the CSS (Customer Satisfaction Service) or NRS, and if the function is valid, an image for automatic notification is displayed on a screen to automatically notify a service center of the failure.

In step S103, if the notification is sent successfully, the automatic notification image displays that the image processing apparatus is waiting for service from the service center.

Or, as in step S105, the automatic notification image displays that service will be provided on the next service day because it is outside service hours.

In steps S104 and S106, the image processing apparatus 1 waits to be switched on/off.

In step S107, if transmission of the notification fails, the automatic notification image displays that the user should contact the service center.

In step S108, the image processing apparatus waits to be switched on/off.

In step S109, if the failure of type D is a rebooting failure, for example, the failure of type D occurs for the first time, even when the automatic notification function of the image processing apparatus 1 is valid, the automatic notification is not performed, but an image is displayed on the screen to announce the start of an automatic reboot process.

What is displayed in this image may include, for example, a message indicating that data of the processes being executed may be deleted due to the reboot, and it is necessary to run the processes again, or procession conditions of post processing of the hardware resources and the programs related to the automatic reboot process, the time up to execution of the automatic reboot process, or a button for initiating an immediate start of the automatic reboot process.

Here, the post processing of the hardware resources and the programs related to the automatic reboot process is processing for appropriately executing the automatic reboot process, for example, for preventing sheets from being left in the engine, or preventing troubles with the HDD.

As the time up to execution of the automatic reboot process, for example, a waiting period of 30 seconds may be set after the post processing is completed and the automatic reboot process becomes executable. The reason for the waiting period is that when the post processing is completed in a short time, the image for announcing the start of the automatic reboot process can be displayed for only a short time, and the user cannot recognize the message in the image.

The button for initiating an immediate start of the automatic reboot process is provided for the purpose of quickly executing the automatic reboot process without the waiting period so as to accelerate recovery of the image processing apparatus 1.

In step S110, when the waiting period displayed in the image for announcing start of the automatic reboot process elapses, the automatic reboot process is executed.

In step S111, the user is notified of completion of the automatic reboot process, and an image is displayed on the screen to require the user to make confirmation.

In step S112, after the user pushes a confirmation button, the display returns back to the usual display condition.

In step S113, if the user pushes the button for an immediate start of the automatic reboot process, the automatic reboot process is executed without the waiting period. Then, as in step S112, the display returns back to the usual display condition.

In this case, step S111 is omitted, that is, it is not necessary to display an image to notify the user of completion of the automatic reboot process and to require the user to make confirmation.

In step S117, if the automatic notification function of the image processing apparatus 1 is invalid, or the image processing apparatus 1 does not have the automatic notification function, in case of a failure of type A, or when the failure of type D is not a rebooting failure, an image is displayed on the screen to show that the user should contact the service center.

In step S118, the image processing apparatus 1 waits to be switched on/off.

In step S114, if the failure of type D is a rebooting failure, an image the same as that in step S109 is displayed on the screen to announce the start of an automatic reboot process.

In step S115, when a preset waiting period elapses, the automatic reboot process is executed. Then, as in step S111, the user is notified of completion of the automatic reboot process, and the confirmation image is displayed on the screen to require the user to make confirmation. Then, as in step S112, after the user pushes a confirmation button, the display returns back to the usual display condition.

In step S116, if the user pushes the button for an immediate start of the automatic reboot process, the automatic reboot process is executed without the waiting period. Then, as in step S112, the display returns back to the usual display condition.

According to the above operations, the image processing apparatus 1 is capable of automatic and appropriate reboot without operations by users when dealing with failures which can possibly be recovered from by switching off/on the electric power without the necessity of automatic notification to a service center.

Figure 9:
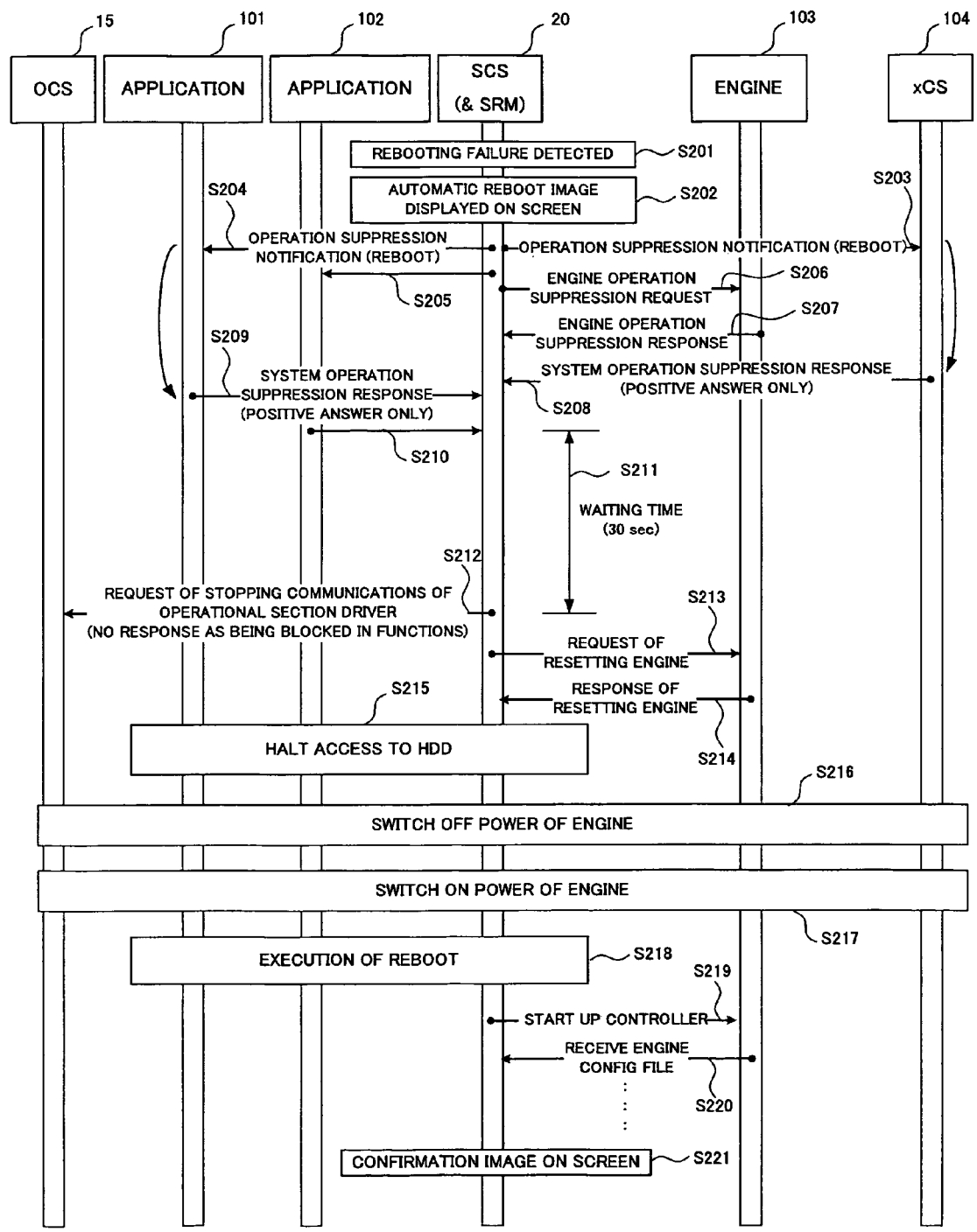
FIG. 9 is a diagram illustrating a sequence of automatic rebooting operations of the image processing apparatus 1 when a rebooting failure occurs according to the first embodiment of the present invention.

FIG. 9 is a diagram illustrating a sequence of operations of automatically rebooting the image processing apparatus 1 when a rebooting failure occurs.

In FIG. 9, the same reference numbers as in FIG. 5 are assigned to the OCS (operation panel control service) 15 and the SCS (system control service) 20. Further, in FIG. 9, for convenience, it is assumed that the SCS 20 also includes functions of the SRM (system resource manager) 21.

In addition, in FIG. 9, applications 101, 102 respectively correspond to the printer application 9, the copier application 10, the facsimile machine application 11, and the scanner application 12 illustrated in FIG. 5, and an engine 103 corresponds to the hardware resources 4 in FIG. 5, an xCS 104 corresponds to processes in the control service layer, such as the NCS 13, DCS 14, FCS 16, ECS 17, MCS 18, and UCS 19.

In FIG. 9, the reboot process is primarily executed by the functional sections of the SCS 20 shown in FIG. 7.

As illustrated in FIG. 9, in step S201, a rebooting failure occurs in the image processing apparatus 1. For example, the failure is of type D, and occurs for the first time, and the SCS 20 detects this failure.

In step S202, an image is displayed on a screen to announce the start of the automatic reboot process.

In steps S203 through S206, notifications of operation suppression are sent from the SCS 20 to the xCS 104, the applications 101, 102, and the engine 103 almost at the same time.

In steps S207 through S210, the component sections of the image processing apparatus, which have received the notifications, are driven to undertake operation suppression processing, and send responses to the SCS 20. For example, the SCS 20 sets a timeout period of 3 minutes for receiving the responses from the component sections.

The operation suppression processing is a kind of post-processing for appropriately terminating processes being executed so that rebooting can be executed safely. For example, the operation suppression includes processing that prevents new operations by controlling an interface.

In step S211, for example, the SCS 20 waits for 30 seconds, and then starts the automatic reboot process.

In step S212, the SCS 20 requests the OCS 15 to stop communications of an operational section driver, but no response is obtained as being blocked in functions.

In step S213, the SCS 20 requests to reset the engine 103.

In step S214, the SCS 20 receives a response from the engine 103.

Afterward, steps S215 through S218 are executed sequentially.

Specifically, in step S215, the SCS 20 halts access to the HDD.

In step S216, the SCS 20 switches off the power of the engine 103.

In step S217, the SCS 20 switches on the power of the engine 103.

In step S218, the SCS 20 reboots applications 101, 102.

In step S219, the SCS 20 starts a controller of the engine 103.

In step S220, the SCS 20 receives an engine Config file from the engine 103.

In step S221, the SCS 20 notifies a user of completion of the automatic reboot process, and displays an image to require the user to make confirmation.

As described above, by suppressing operations of the component sections so as to abort those processes being executed and halt the interface, the reboot process can be executed rapidly without residual sheets, troubles with the HDD, or data remnants.

However, in the course of the automatic reboot process or the automatic notification process, other failures may happen.

FIG. 10 is a table illustrating patterns of operations in response to failures during the automatic reboot process or the automatic notification process. In FIG. 10, failures are classified into classes of failures occurring for the first time and failures occurring for the second time.

In FIG. 10, an index "X" represents cases in which the response is made under the conditions that the automatic notification is made when a failure of type A occurs, or when the failure of type D occurs but it is not a rebooting failure (for example, the failure of type D occurs for the second time when the count of a general counter for counting the number of the printing sheets increases toward 10).

Meanwhile, an index "Y" represents cases corresponding to the operations shown in FIG. 8 and FIG. 9, that is, with the problems in the above cases X being eliminated.

Inspecting pattern (1) and pattern (3) in FIG. 10, in pattern (1), the automatic reboot process is started because of the first-time failure of type D; afterward, when the second-time failure of type D occurs, in cases X, the automatic reboot process is aborted and the automatic notification process is started.

However, in this case, because of control of suppression of operations of the component sections, which is performed at the beginning of the reboot process, the automatic notification function given by NRS does not work; hence, the automatic notification process cannot be executed successfully. In addition, once transferring to the automatic notification process, the count indicating the frequency of the type D failure is cleared, thus if the type D failure happens again after the unsuccessful automatic notification, the type D failure otherwise counted as the third one is treated as the first one, and the automatic reboot process is executed again, resulting in repeated execution of the automatic reboot process.

On the other hand, in the pattern (3), the second-time failure is of type A; because of operation suppression control, similarly, the automatic notification process cannot be executed successfully. Furthermore, because the image processing apparatus is in a SP mode (special mode), the failure cannot be recovered from without a failure fixing operation by a service person, just like failures of a fusing section. Hence, after manual reboot, the same failure of type A occurs.

Figure 11:
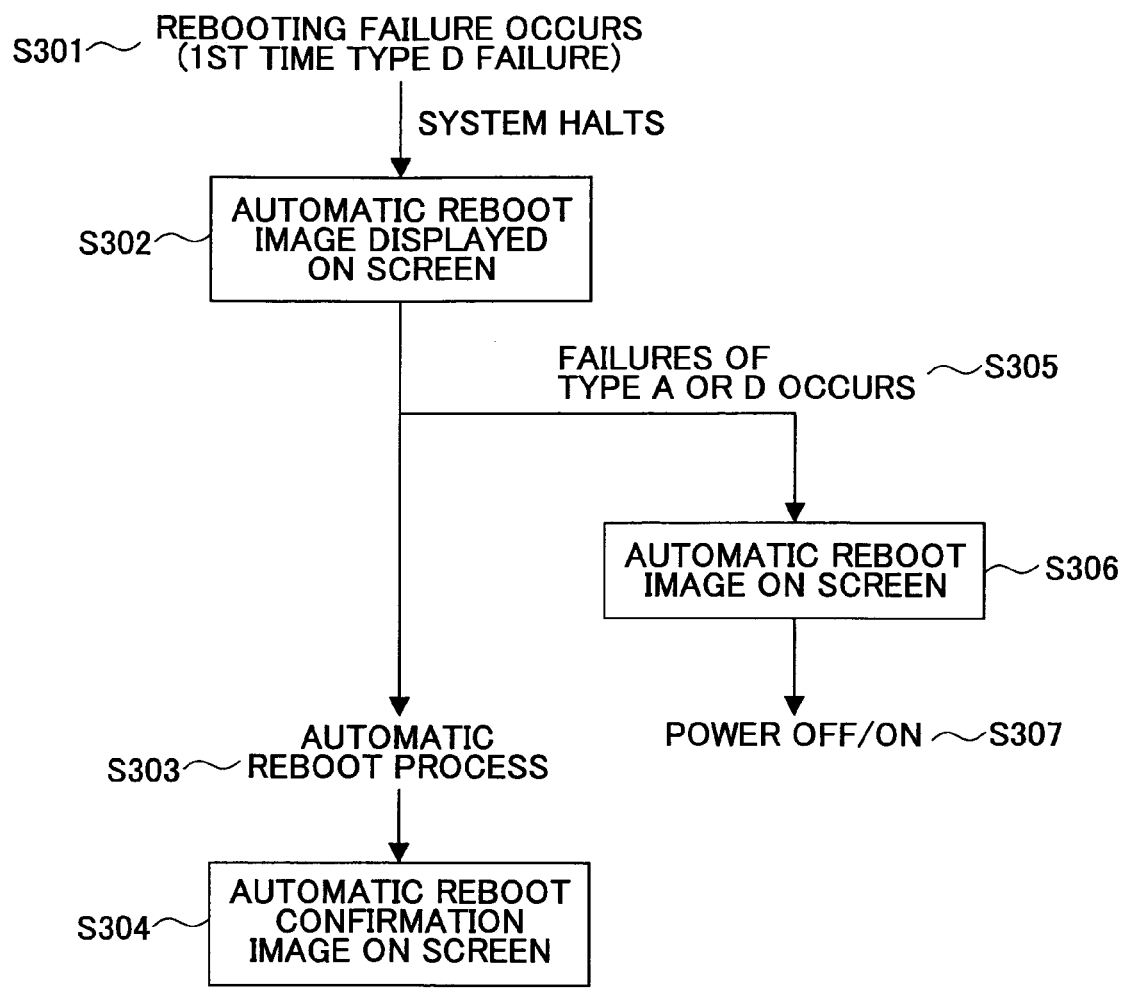
FIG. 11 is a diagram showing operations when failures occur during the automatic reboot process, corresponding to the cases X in FIG. 10.

FIG. 11 is a diagram showing operations when failures occur during the automatic reboot process, corresponding to the cases X in FIG. 10.

As illustrated in FIG. 11, in step S301, a rebooting failure of the image processing apparatus 1 occurs.

In step S302, an image is displayed on the screen to announce the start of an automatic reboot process.

In a usual way, as in step S303, the automatic reboot process is executed, and as in step S304, after a confirmation image is displayed on the screen, the process is completed.

However, if a failure of type A or type D occurs in the course of the process, as in step S305, as in step S306, the automatic notification is performed (when the automatic notification function is invalid, an image for a service call is displayed on the screen), and the process stops at a state of waiting for the power to be switched off/on.

Due to this problem, in the cases Y, when other failures happen after the automatic reboot process is started, information of the failure is written only in a log, and execution of the automatic reboot process continues.

Figure 12:
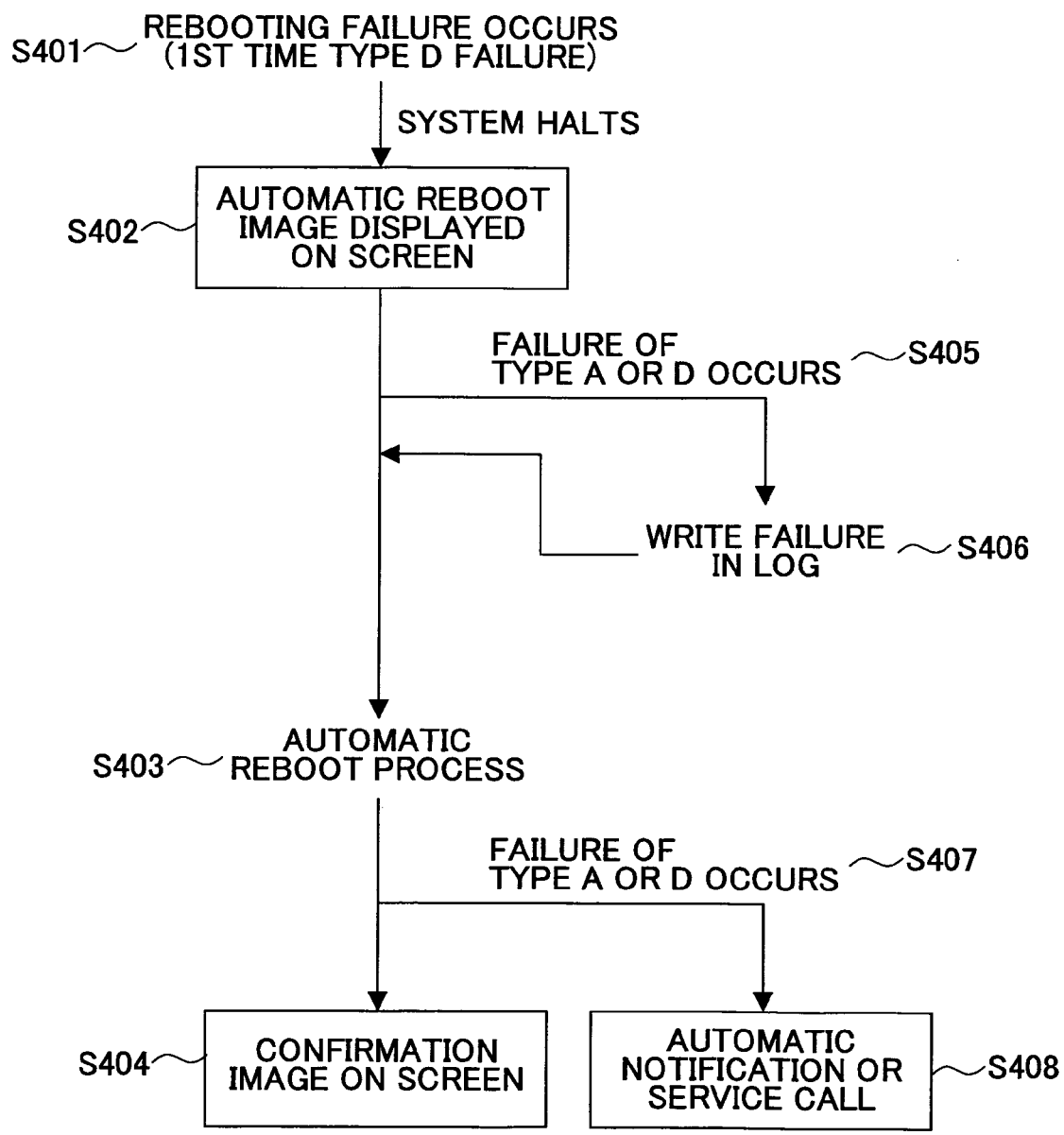
FIG. 12 is a diagram showing operations when failures occur during the automatic reboot process, corresponding to the cases Y in FIG. 10.

FIG. 12 is a diagram showing operations when failures occur during the automatic reboot process, corresponding to the cases Y in FIG. 10.

As illustrated in FIG. 12, in step S401, a rebooting failure of the image processing apparatus 1 occurs.

In step S402, an image is displayed on the screen to announce the start of the automatic reboot process.

Then, in step S405, another failure of type A or type D occurs in the course of the automatic reboot process.

In step S406, even when another failure of type A or type D occurs, only the information of the failure is written in a log.

Then, in step S403, the automatic reboot process is executed.

After the automatic reboot process is executed, usually a confirmation image is displayed on the screen, and then the automatic reboot process is completed, as in step S404.

If a failure which ought to be automatically reported occurs before step S404 (for example, in case of the failure of a fusing section, a type A failure occurs surely), as in step S407, automatic notification is performed (when the automatic notification function is invalid, an image for a service call (SC) is displayed on the screen), as in step S408. In this way, appropriate operations are carried out according to the contents of the failures.

Figure 13:
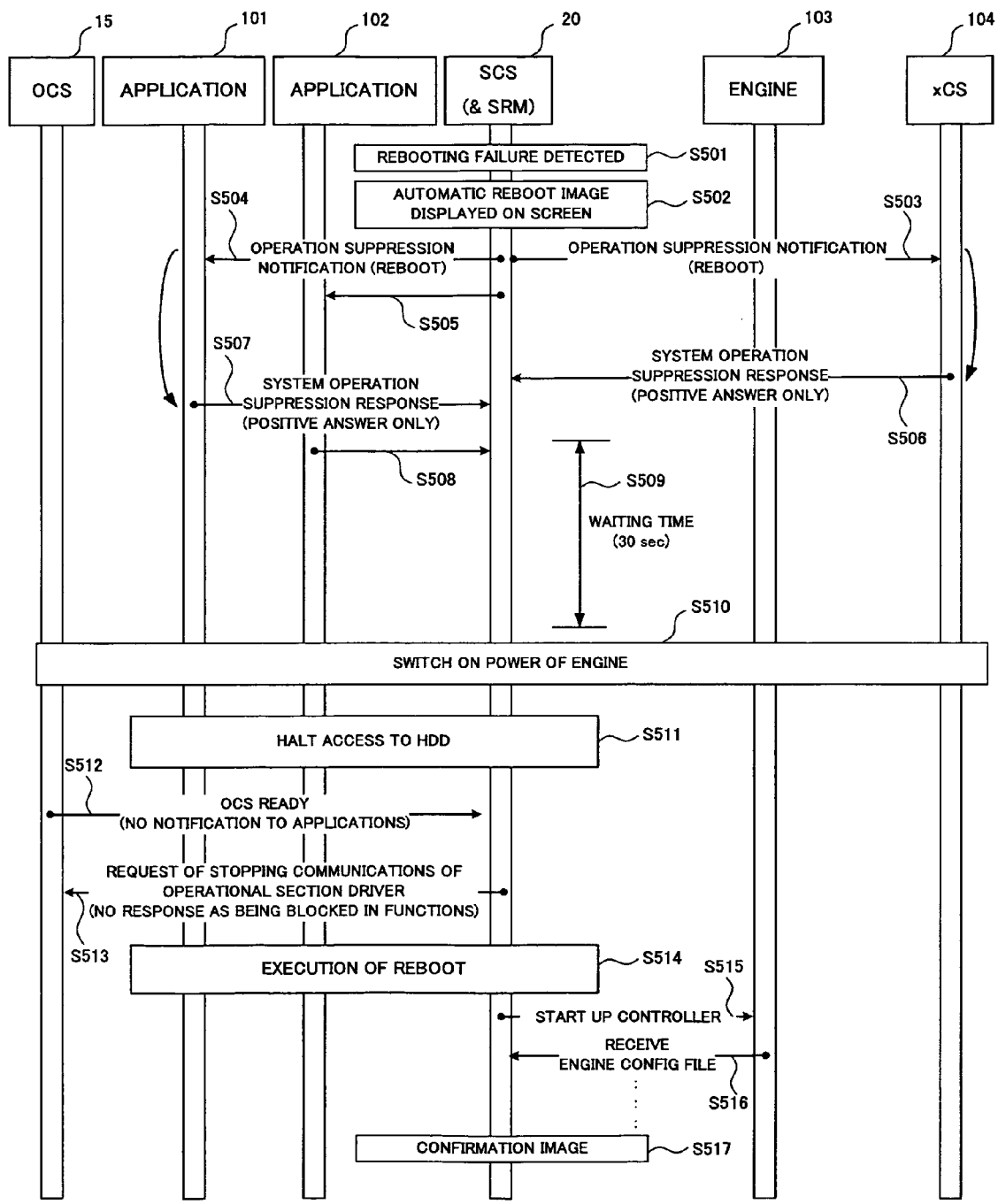
FIG. 13 is a diagram illustrating a sequence of rebooting operations of the image processing apparatus 1 during a transition to an energy saving mode according to the first embodiment of the present invention.

FIG. 13 is a diagram illustrating a sequence of operations of rebooting the image processing apparatus 1 during a transition to an energy saving mode.

In order to reduce power consumption, an image processing apparatus is often set to be in the energy saving mode. FIG. 13 illustrates an automatic rebooting process when a rebooting failure occurs during the transition to the energy saving mode.

As illustrated in FIG. 13, in step S501, a rebooting failure occurs in the image processing apparatus 1. For example, the failure is of type D, and occurs for the first time, and the SCS 20 detects this failure.

In step S502, an image is displayed on the screen to announce the start of the automatic reboot process.

In steps S503 through S505, notifications of operation suppression are sent from the SCS 20 to the xCS 104, and the applications 101, 102 almost at the same time. The SCS 20 does not send the notification of operation suppression to the engine 103, because the SCS 20 detected that the engine 103 is substantially in a resting state due to transition to the energy saving mode.

In steps S506 through S508, the component sections of the image processing apparatus 1, which have received the notifications, are driven to undertake operation suppression processing, and send responses to the SCS 20. For example, the SCS 20 sets a timeout period of 3 minutes for receiving the responses from the component sections.

The operation suppression processing is a kind of post-processing for appropriately terminating processes being executed so that reboot can be executed safely. For example, the operation suppression includes processing that prevents new operations by controlling an interface.

In step S509, for example, the SCS 20 waits for 30 seconds, and then starts the reboot process.

In step S510, first, the SCS 20 switches on the engine 103.

Afterward, in step S511, the SCS 20 halts access to the HDD.

In step S512, the SCS 20 receives ready notification from the OCS 15.

In step S513, the SCS 20 requests the OCS 15 to abort communications of an operational section driver.

In step S514, because the engine 103 is substantially in a resting state due to transition to the energy saving mode, the SCS 20 does not request to reset the engine 103, nor switch off the power of the engine 103.

In step S514, the SCS 20 reboots the applications 101, 102.

In step S515, the SCS 20 starts a controller of the engine 103.

In step S516, the SCS 20 receives an engine Config file from the engine 103.

In step S517, the SCS 20 notifies a user of completion of the automatic reboot process, and displays an image to require the user to make confirmation.

In this way, it is possible to appropriately carry out the reboot process even when the image processing apparatus 1 is transiting to the energy saving mode.

Second Embodiment

The image processing apparatus of the present embodiment has the same configuration as illustrated in FIG. 5 and FIG. 6. Below, the same reference numbers are assigned to the same elements as in the first embodiment, and overlapping descriptions are omitted.

Figure 14:
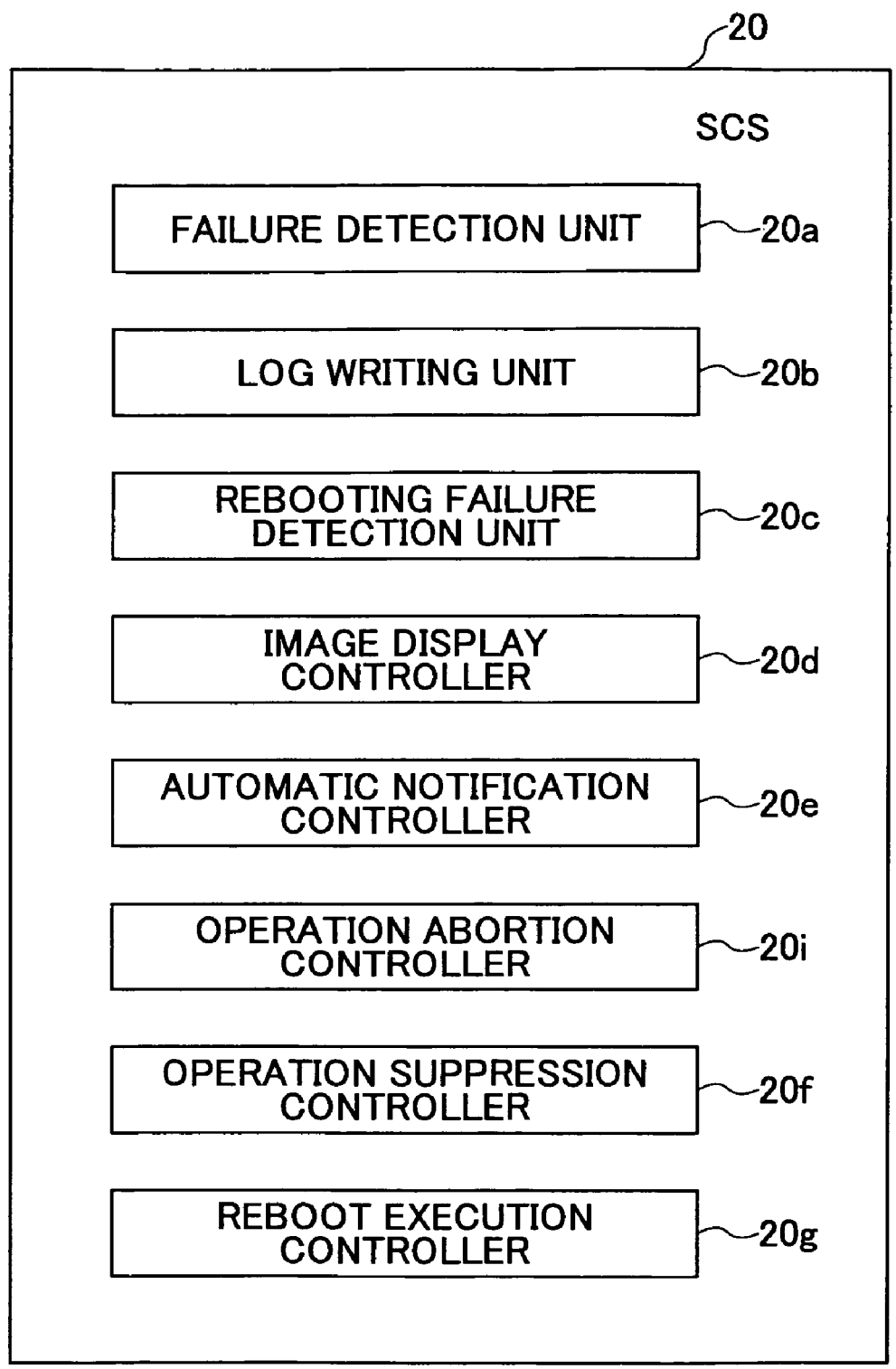
FIG. 14 is a block diagram schematically showing another example of functional sections of the SCS 20 shown in FIG. 5, which is configured to cope with failures of the image processing apparatus 1 according to a second embodiment of the present invention.

FIG. 14 is a block diagram schematically showing an example of functional sections of the SCS 20 shown in FIG. 5, which is configured to cope with failures of the image processing apparatus 1 according to the second embodiment of the present invention. Further, in FIG. 14, only sections related to fixing failures are illustrated.

The configuration shown in FIG. 14 is basically the same as that in FIG. 7 except that an operation abortion controller 20*i* is included.

Specifically, the SCS 20 includes an automatic notification controller 20*e* that automatically notifies a service center of the failure by using NRS (New Remote Service) when failures of type A or type D occur at a predetermined frequency, for example, the failures of type D have occurred twice when the count of the general counter for counting the number of the printing sheets increases to 10. The NRS is a diagnosis service utilizing the aforesaid CSS or a network.

Further, the SCS 20 includes an operation abortion controller 20*i* that performs controls to abort operations of the hardware resources 4 of the image processing apparatus 1, such as an engine, or the programs (software group 2), after the rebooting failure is detected and before the reboot process starts. For example, the operation abortion may include abortion of jobs, abortion of generation of new process control, or others.

Further, the SCS 20 includes an operation suppression controller 20*f* that performs controls to suppress operations of an engine, or the programs after receiving a response indicating operation abortion. For example, the operation suppression may include suppression of new operations, suppression of communications between processes, and suppression of access to the HDD.

Figure 15:
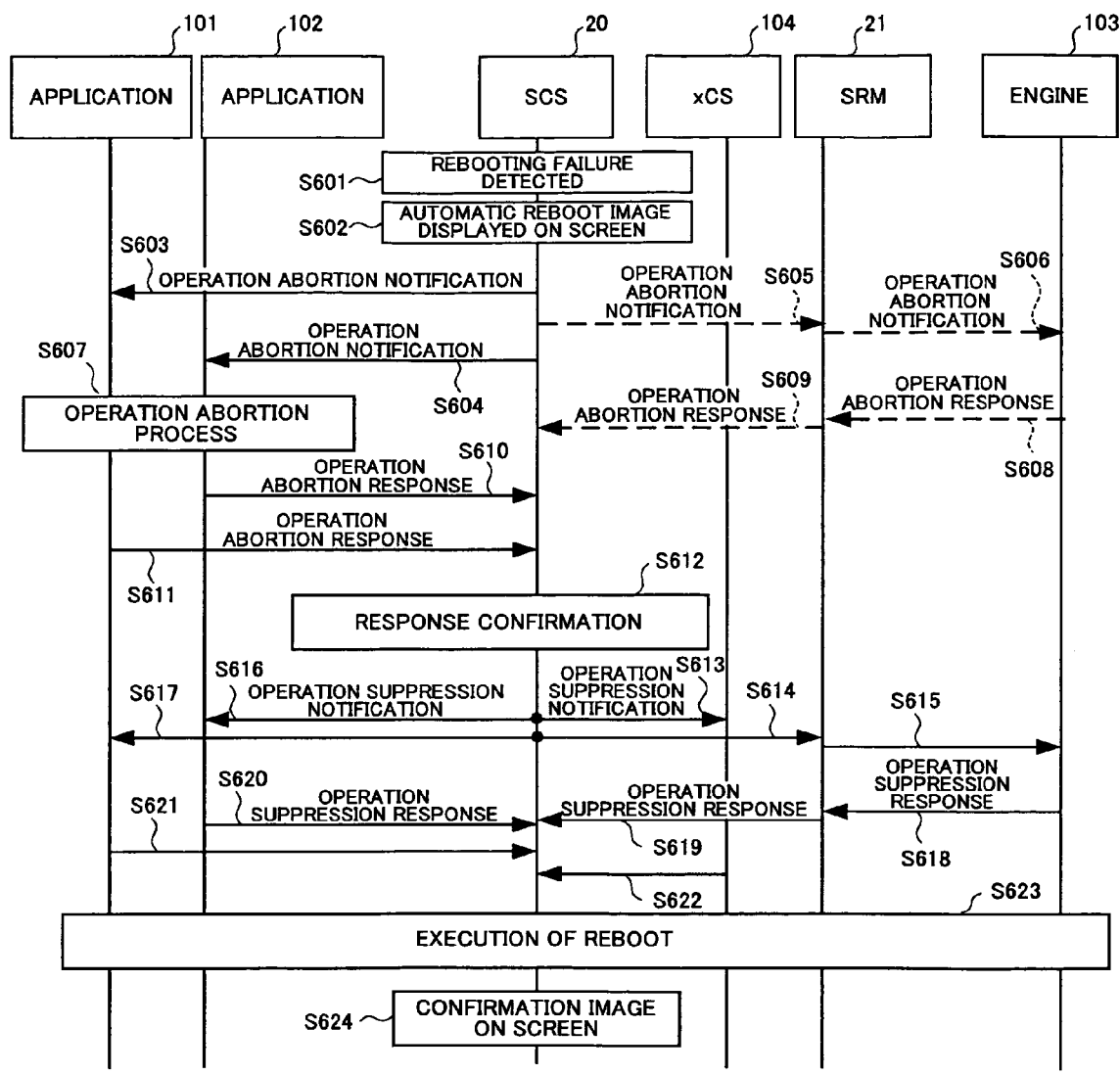
FIG. 15 is a diagram illustrating a sequence of operations of automatically rebooting the image processing apparatus 1 when a rebooting failure occurs, according to the second embodiment of the present invention.

FIG. 15 is a diagram illustrating a sequence of operations of automatically rebooting the image processing apparatus 1 when a rebooting failure occurs, according to the present embodiment.

As illustrated in FIG. 15, in step S601, a rebooting failure occurs in the image processing apparatus 1. For example, the failure is of type D, occurs for the first time, and the SCS 20 detects this failure.

In step S602, an image is displayed on the screen to announce the start of the automatic reboot process.

In steps S603 through S606, notifications of operation abortion are sent from the SCS 20 to the xCS 104, the applications 101, 102, and the engine 103 via the SRM 21 almost at the same time.

In step S607, the applications 101, 102 start operation abortion processing, and abort jobs.

In steps S610 and S611, when the operation abortion processing is completed, responses indicating operation abortion are sent to the SCS 20.

In steps S608 and S609, the engine 103 is in a state not allowing new process control, and sends a response indicating operation abortion to the SCS 20.

In step S612, the SCS 20 confirms responses from the component sections of the image processing apparatus.

Then, in steps S613 through S617, the SCS 20 sends notifications of operation suppression to the xCS 104, the applications 101, 102, and the engine 103 via the SRM 21 almost at the same time.

In step S618, the component sections of the image processing apparatus, which have received the notifications, are driven to undertake operation suppression processing. The operation suppression processing is a kind of post-processing for appropriately terminating processes being executed so that rebooting can be executed safely. For example, the operation suppression includes processing that prevents new operations by controlling an interface.

In steps S618 through S622, the SCS 20 receives the responses from the component sections of the image processing apparatus.

In step S623, the SCS 20 then starts the automatic reboot process.

In step S624, the SCS 20 notifies a user of completion of the automatic reboot process, and displays an image to require the user to make confirmation.

Figure 16:
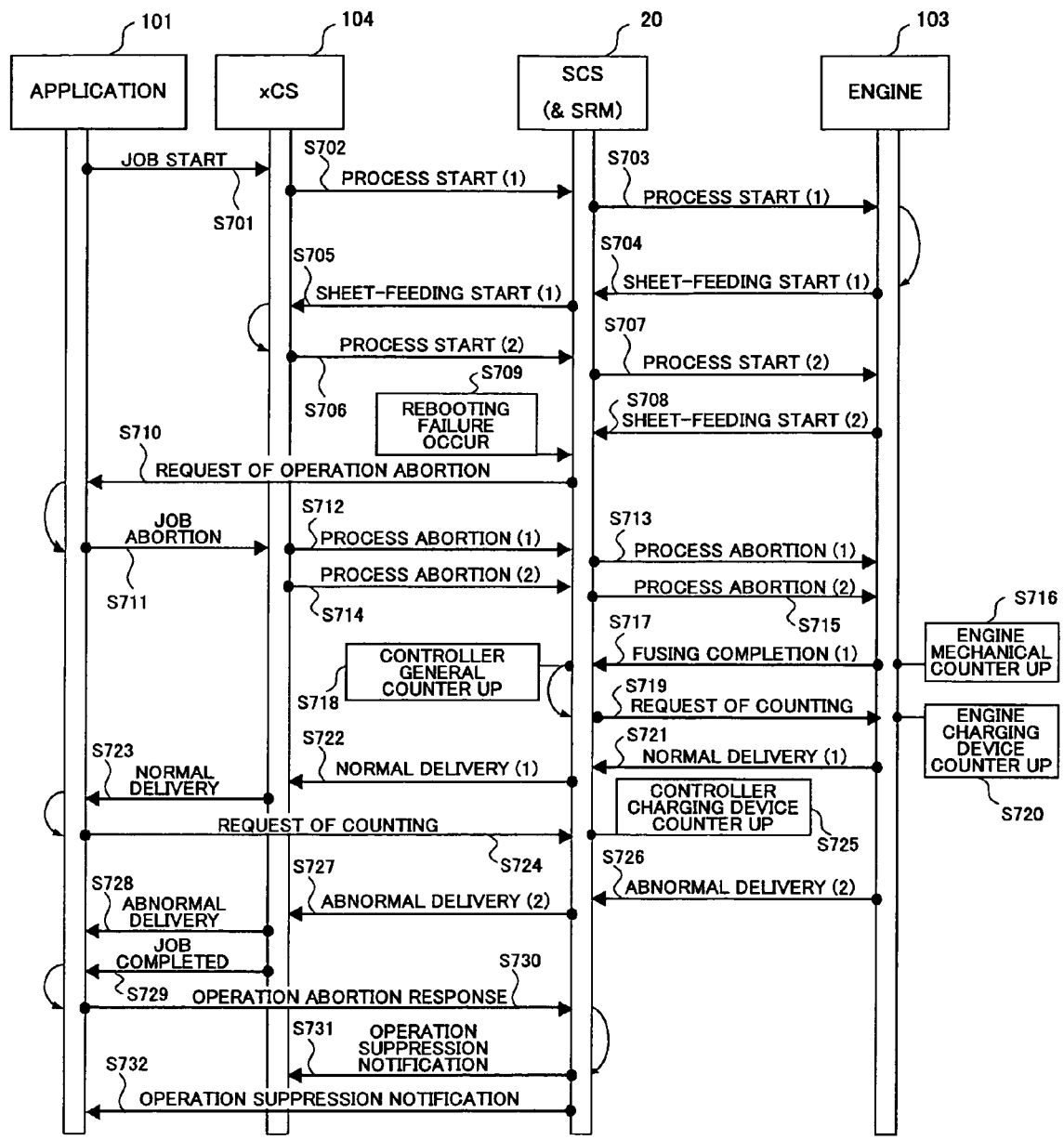
FIG. 16 is a diagram illustrating a sequence of operations of counters in the image processing apparatus 1 when a rebooting failure occurs according to the second embodiment of the present invention.

FIG. 16 is a diagram illustrating a sequence of operations of the counters in the image processing apparatus 1 when a rebooting failure occurs according to the present embodiment. Specifically, FIG. 16 illustrating operations during printing from the step S601, that is, a rebooting failure occurs in the image processing apparatus, to steps S616, S617, that is, the SCS 20 sends notifications of operation suppression.

Here, it is assumed that two sheets are printed sequentially.

As illustrated in FIG. 16, in step S701, a notification of starting a printing job is transmitted from the application 101 to the xCS 104.

In step S702, receiving the notification from the application 101, the xCS 104 notifies the SCS 20 to start a process of printing the first sheet.

In step S703, receiving the notification from the xCS 104, the SCS 20 notifies the engine 103 to start the process of printing the first sheet.

In step S704, receiving the notification from SCS 20, the engine 103 starts to feed the first sheet, and notifies the SCS 20 that the first sheet is fed.

In step S705, the SCS 20 further notifies the xCS 104 that the first sheet is fed.

In step S706, receiving the notification from the SCS 20, the xCS 104 notifies the SCS 20 to start a process of printing the second sheet.

In step S707, the SCS 20 notifies the engine 103 to start the process of printing the second sheet.

In step S708, the engine 103 starts to feed the second sheet, and notifies the SCS 20 that the second sheet is fed.

In step S709, a rebooting failure occurs in the image processing apparatus.

In step S710, the SCS 20 requests the application 101 to abort operations.

In step S711, receiving the request, the application 101 notifies the xCS 104 to cancel jobs.

In step S712, the xCS 104 notifies the SCS 20 to cancel the process of printing the first sheet.

In step S713, the SCS 20 notifies the engine 103 to cancel the process of printing the first sheet.

Next, similarly, in step S714, the xCS 104 notifies the SCS 20 to cancel the process of printing the second sheet.

In step S715, the SCS 20 notifies the engine 103 to cancel the process of printing the second sheet.

In step S716, the engine 103 attempts to cancel processes as much as possible. Assuming that the process of printing the first sheet is being executed and hence cannot be aborted immediately, the engine 103 executes printing of the first sheet, and increments the count of the mechanical counter of the engine 103 when fusing on the first sheet is completed.

In step S717, the engine 103 notifies the SCS 2203 of completion of fusing on the first sheet.

In step S718, upon receiving the notification from the engine 103, the SCS 20 increments the count in the general counter of the controller.

In step S719, the SCS 20 requests the engine 103 to count.

In step S720, upon receiving the request from the SCS 20, the engine 103 increments the count in the counter of the charging device in the engine.

Afterward, in step S721, when the first sheet is normally delivered, the engine 103 notifies the SCS 20 of the normal delivery of the first sheet.

In step S722, the SCS 20 further notifies the xCS 104 of the normal delivery of the first sheet.

In step S723, the xCS 104 further notifies the application 101 that the first sheet is normally delivered.

At this moment, because of the operation abortion processing, instead of the operation suppression processing, the interface is not suppressed, and the notification canl be normally sent to the application 101.

In step S724, receiving the request from the xCS 104, the application 101 requests the SCS 20 to count.

In step S725, the SCS 20 increments the count in the counter of the charging device in the controller.

Afterward, In step S726, the engine 103 cancels the process of printing the second sheet, performs abnormal sheet delivery of the second sheet (delivers the second sheet without its being printed), and notifies the SCS 20 of the abnormal delivery of the second sheet.

In step S727, the SCS 20 further notifies the xCS 104 of the abnormal delivery of the second sheet.

In step S728, the xCS 104 further notifies the application 101 of the abnormal delivery of the second sheet.

In step S729, because abortion of processes related to successive printing jobs is completed, the xCS 104 notifies the application 101 of job completion.

In step S730, the application 101 notifies the SCS 20 of a response indicating stoppage of the operation.

In steps S731, S732, the SCS 20 waits for responses indicating operation abortion from other components (for example, a time out period may be put on) and starts the operation suppression process.

As described above, once the first sheet is normally printed, the engine mechanical counter, the engine charging device counter, the controller general counter of the, and the controller charging device counter count the printing operation of the first sheet and increment counts of these counters correctly, hence, the counts in these counters are not in agreement, and disagreement as in the related art does not occur.

Figure 17:
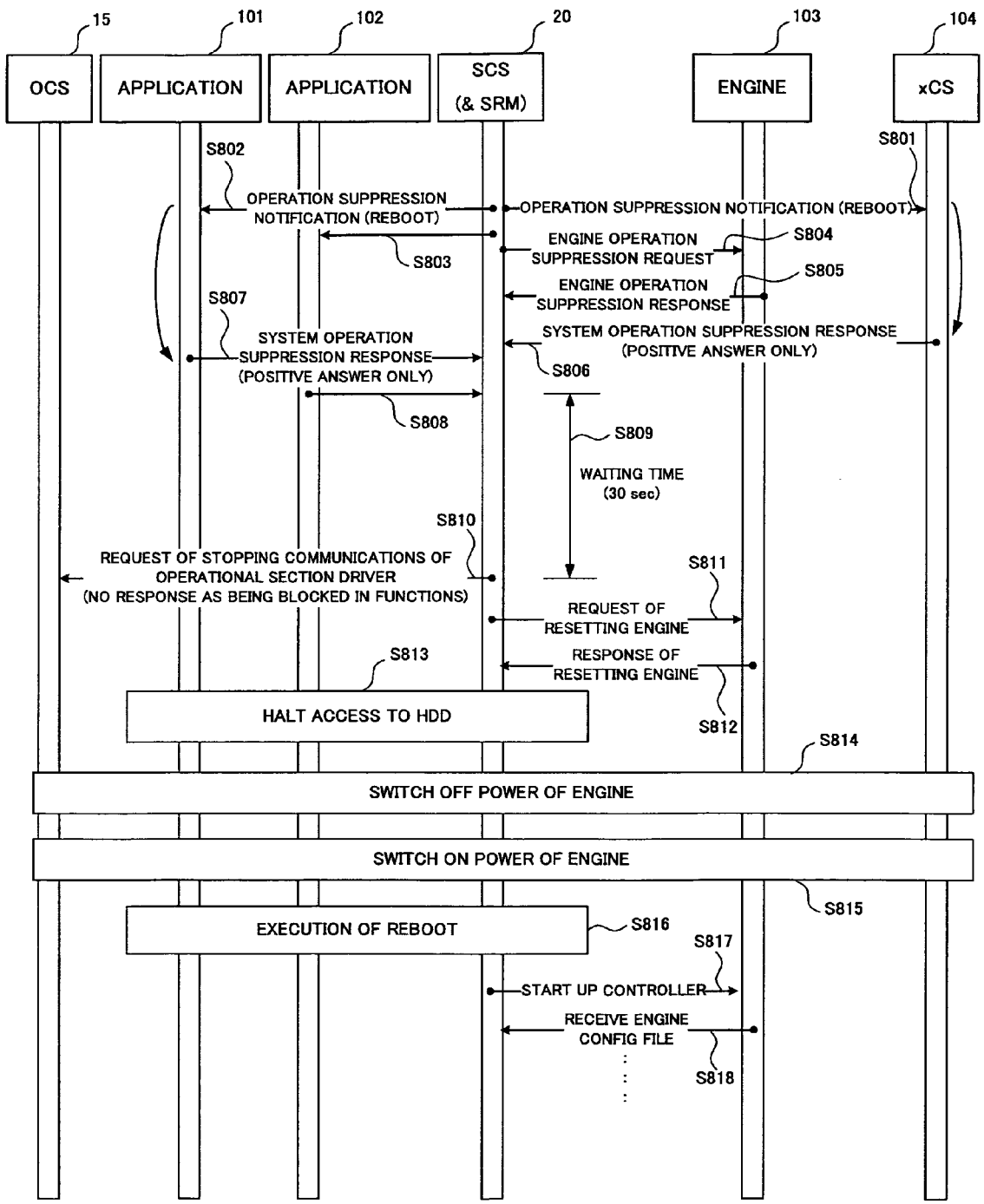
FIG. 17 is a diagram illustrating a sequence of operations of from the step of operation suppression to the step of executing rebooting of the image processing apparatus 1.

FIG. 17 is a diagram illustrating a sequence of operations from the step of operation suppression to the step of executing rebooting of the image processing apparatus 1.

In FIG. 17, in steps S801 through S804, notifications of operation suppression are sent from the SCS 20 to the xCS 104, the applications 101, 102, and the engine 103.

In steps S805 through S808, the component sections of the image processing apparatus 1, which have received the notifications, are driven to undertake operation suppression processing, and send responses to the SCS 20. For example, the SCS 20 sets a timeout period of 3 minutes for receiving the responses from the component sections.

The operation suppression processing is a kind of post-processing for appropriately terminating processes being executed so that rebooting can be executed safely.

In step S809, for example, the SCS 20 waits for 30 seconds, and then starts the automatic reboot process.

In step S810, the SCS 20 requests the OCS 15 to stop communications of an operational section driver, but no response is obtained as being blocked in functions.

In step S811, the SCS 20 requests to reset the engine 103.

In step S812, the SCS 20 receives a response from the engine 103.

Afterward, steps S813 through S816 are executed sequentially.

Specifically, in step S813, the SCS 20 halts access to the HDD.

In step S814, the SCS 20 switches off the power of the engine 103.

In step S815, the SCS 20 switches on the power of the engine 103.

In step S816, the SCS 20 reboots applications 101, 102.

In step S817, the SCS 20 starts a controller of the engine 103.

In step S818, the SCS 20 receives an engine Config file from the engine 103.

As described above, by suppressing operations of the component sections so as to abort those processes being executed and halt the interface, the reboot process can be executed rapidly without residual sheets, troubles with the HDD, or data remnants.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Applications No. 2004-027232 filed on Feb. 3, 2004 and No. 2004-033953 filed on Feb. 10, 2004, the entire contents of which are hereby incorporated by reference.

What is claimed is:

1. An image processing apparatus including hardware resources used for image formation and programs used for controlling the image formation, said image processing apparatus comprising:
   a failure detection unit configured to detect a first failure of the image processing apparatus from a plurality of second failures of the image processing apparatus, the image processing apparatus being rebooted when the first failure occurs, said second failures of the image processing apparatus being recoverable by switching off and switching on electric power of the image processing apparatus; and
   a reboot unit configured to reboot the hardware resources and the programs,
   wherein when the image processing apparatus is printing sheets until reaching a predetermined number, the first failure occurs before a number of the second failures reaches a predetermined value.

2. The image processing apparatus as claimed in claim 1, wherein the predetermined number of sheets to be printed is 10, and the predetermined value of the number of the second failures is 2.

3. The image processing apparatus as claimed in claim 1, wherein the failure detection unit and the reboot unit are realized as functions of a system control service that performs at least application management, operational section control, system message display, LED display, hardware resources management, and interruption application control.

4. The image processing apparatus as claimed in claim 1, wherein operations of the hardware resources and the programs are suppressed after the first failure is detected.

5. The image processing apparatus as claimed in claim 4, wherein the image processing apparatus stands by from the time when the hardware resources and the programs make responses to the operation suppression to the time when the reboot process is executed.

6. The image processing apparatus as claimed in claim 1, wherein in the reboot process of the hardware resources and the programs, sequentially, an engine is reset, access to a hard disk drive is halted, power of the engine is switched off, the power of the engine is switched on, and an application is rebooted.

7. An image processing apparatus including hardware resources used for image formation and programs used for controlling the image formation, said image processing apparatus comprising:
   a failure detection unit configured to detect a first failure of the image processing apparatus from a plurality of second failures of the image processing apparatus, the image processing apparatus being rebooted when the first failure occurs, said second failures of the image processing apparatus being recoverable by switching off and switching on electric power of the image processing apparatus; and
   a reboot unit configured to reboot the hardware resources and the programs,
   wherein from the time when the first failure is detected to the time when the reboot process is executed, even when another failure occurs that ought to be reported automatically, the reboot process continues without automatic notification of the other failure being performed.

8. An image processing apparatus including hardware resources used for image formation and programs used for controlling the image formation, said image processing apparatus comprising:
   a failure detection unit configured to detect a first failure of the image processing apparatus from a plurality of second failures of the image processing apparatus, the image processing apparatus being rebooted when the first failure occurs, said second failures of the image processing apparatus being recoverable by switching off and switching on electric power of the image processing apparatus; and
   a reboot unit configured to reboot the hardware resources and the programs,
   wherein in the reboot process of the hardware resources and the programs, if an energy saving mode is detected, the power of the engine is switched on after post-processing.

9. The image processing apparatus as claimed in claim 8, wherein after the power of the engine is switched on, sequentially, access to the hard disk drive is halted and the application is rebooted.

10. An image processing apparatus including hardware resources used for image formation and programs used for controlling the image formation, said image processing apparatus comprising:
    a failure detection unit configured to detect a first failure of the image processing apparatus from a plurality of second failures of the image processing apparatus, the image processing apparatus being rebooted when the first failure occurs, said second failures of the image processing apparatus being recoverable by switching off and switching on electric power of the image processing apparatus; and
    a reboot unit configured to reboot the hardware resources and the programs,
    wherein when the first failure is detected, an image is displayed to announce a start of a reboot process, and
    wherein a button for initiating immediate start of the reboot process is displayed when the image announcing the start of the reboot process is displayed.

11. The image processing apparatus as claimed in claim 10, wherein processing conditions of post processing of the hardware resources and the programs are displayed in the image announcing the start of the reboot process.

12. The image processing apparatus as claimed in claim 10, wherein information of the time up to the execution of the reboot process is displayed in the image announcing the start of the reboot process.

13. An image processing apparatus including hardware resources used for image formation and programs used for controlling the image formation, said image processing apparatus comprising:
    a failure detection unit configured to detect a first failure of the image processing apparatus from a plurality of second failures of the image processing apparatus, the image processing apparatus being rebooted when the first failure occurs, said second failures of the image processing apparatus being recoverable by switching off and switching on electric power of the image processing apparatus; and
    a reboot unit configured to reboot the hardware resources and the programs,
    wherein after the execution of the reboot process, an image is displayed to require a user to make confirmation.

14. A method of automatically rebooting an image processing apparatus including hardware resources used for image formation and programs used for controlling the image formation, said method comprising the steps of:
    detecting a first failure from a plurality of second failures of the image processing apparatus, the image processing apparatus being rebooted when the first failure occurs, said second failures being recoverable by switching off and switching on electric power of the image processing apparatus; and rebooting the hardware resources and the programs when the first failure is detected, wherein from the time when the first failure is detected to the time when the reboot process is executed, even when another failure occurs that ought to be reported automatically, the reboot process continues without automatic notification of the other failure being performed.

15. The method as claimed in claim 14, wherein operations of the hardware resources and the programs are suppressed after the first failure is detected.

16. The method as claimed in claim 14, wherein in the reboot process of the hardware resources and the programs, steps of resetting an engine, halting access to a hard disk drive, switching off power of the engine, switching on the power of the engine, and rebooting an application are executed sequentially.

17. An image processing apparatus including hardware resources used for image formation and programs used for controlling the image formation, said image processing apparatus comprising:

a failure detection unit configured to detect a first failure of the image processing apparatus from a plurality of second failures of the image processing apparatus, the image processing apparatus being rebooted when the first failure occurs, said second failures of the image processing apparatus being recoverable by switching off and switching on electric power of the image processing apparatus;

an operation halting unit configured to halt operations of the hardware resources and the programs when the first failure is detected;

a reboot unit configured to reboot the hardware resources and the programs;

a controller counter provided on a side of a controller of the programs;

a controller charging device counter provided on the side of the controller;

a mechanical counter provided on a side of an engine of the hardware resources; and an engine charging device counter provided on the side of the engine.

18. The image processing apparatus as claimed in claim 17, wherein the halt of operations includes halt of jobs and halt of generation of new control processes.

19. The image processing apparatus as claimed in claim 18, wherein due to the halt of jobs, uncompleted jobs of the programs are cancelled.

20. The image processing apparatus as claimed in claim 17, wherein operations of the hardware resources and the programs are suppressed after halt of the operations and before the reboot process.

21. The image processing apparatus as claimed in claim 20, wherein the image processing apparatus stands by from the time when the hardware resources and the programs make responses to the operation suppression to the time when the reboot process is executed.

22. The image processing apparatus as claimed in claim 17, wherein when the image processing apparatus is printing sheets until reaching a predetermined number, the first failure occurs before a number of the second failures reaches a predetermined value.

23. The image processing apparatus as claimed in claim 22, wherein the predetermined number of sheets to be printed is 10, and the predetermined value of the number of the second failures is 2.

24. The image processing apparatus as claimed in claim 17, wherein the failure detection unit, the operation halting unit, and the reboot unit are realized as functions of a system control service that performs at least application management, operational section control, system message display, LED display, hardware resources management, and interruption application control.

25. The image processing apparatus as claimed in claim 17, wherein in the reboot process of the hardware resources and the programs, sequentially, an engine is reset, access to a hard disk drive is halted, power of the engine is switched off, the power of the engine is switched on, and an application is rebooted.

26. The image processing apparatus as claimed in claim 17, wherein when the first failure is detected, an image is displayed to announce a start of an automatic reboot process.

27. The image processing apparatus as claimed in claim 26, wherein processing conditions of post processing of the hardware resources and the programs are displayed in the image announcing the start of the automatic reboot process.

28. The image processing apparatus as claimed in claim 26, wherein information of the time up to the execution of the reboot process is displayed when the image announcing the start of the automatic reboot process is displayed.

29. The image processing apparatus as claimed in claim 26, wherein a button for initiating immediate start of the reboot process is displayed in the image announcing the start of the automatic reboot process.

30. The image processing apparatus as claimed in claim 17, wherein after the execution of the reboot process, an image is displayed to require a user to make confirmation.

* * * * *